United States Patent [19]

Thompson et al.

[11] Patent Number: 4,493,303

[45] Date of Patent: Jan. 15, 1985

[54] ENGINE CONTROL

[75] Inventors: Lionel D. Thompson; Harold E. Jenkins, both of Hagerstown, Md.; Richard A. Hickerson, Hedgesville, W. Va.; Russell E. Weaver, Sharpsburg, Md.

[73] Assignee: Mack Trucks, Inc., Allentown, Pa.

[21] Appl. No.: 482,379

[22] Filed: Apr. 4, 1983

[51] Int. Cl.³ ............................................. F02D 31/00
[52] U.S. Cl. ..................................... 123/357; 123/352
[58] Field of Search ............................... 123/357–359, 123/492, 480, 493, 352

[56] References Cited

U.S. PATENT DOCUMENTS

| | | | |
|---|---|---|---|
| 3,128,603 | 4/1964 | Haigh | 123/352 |
| 3,722,485 | 3/1973 | Ohtani | 123/357 |
| 3,767,972 | 10/1973 | Noddings et al. | 123/352 |
| 3,835,819 | 9/1974 | Anderson, Jr. | 123/480 |
| 3,862,404 | 1/1975 | Fiedrich | 123/480 |
| 3,863,054 | 1/1975 | Monpetit | 123/483 |
| 3,906,207 | 9/1975 | Rivere et al. | 123/352 |
| 3,963,091 | 6/1976 | Noddings et al. | 123/357 |
| 3,964,443 | 6/1976 | Hartford | 123/416 |
| 3,983,851 | 10/1976 | Hoshi | 123/486 |
| 4,009,699 | 3/1977 | Hetzler et al. | 123/416 |
| 4,020,814 | 5/1977 | Hewitt et al. | 123/359 |
| 4,066,874 | 1/1978 | Shaw | 123/352 |
| 4,078,531 | 3/1978 | Hewitt | 123/198 D |
| 4,084,240 | 4/1978 | Lappington | 123/480 |
| 4,157,701 | 6/1979 | Holtrop et al. | 123/357 |
| 4,163,282 | 7/1979 | Yamada et al. | 123/480 |
| 4,184,460 | 1/1980 | Harada et al. | 123/491 |
| 4,192,398 | 3/1980 | Hunt | 123/357 |
| 4,193,380 | 3/1980 | Marchak et al. | 123/480 |
| 4,200,064 | 4/1980 | Engele | 123/480 |
| 4,200,076 | 4/1980 | Straubel et al. | 123/340 |
| 4,211,193 | 7/1980 | Cox et al. | 123/352 |
| 4,212,279 | 7/1980 | Ohtani | 123/357 |
| 4,214,306 | 7/1980 | Kobayashi | 123/480 |
| 4,257,361 | 3/1981 | Kasiewicz | 123/352 |
| 4,270,502 | 6/1981 | Seilly | 123/357 |
| 4,294,341 | 10/1981 | Swart | 192/0.073 |
| 4,348,728 | 9/1982 | Sagisaka et al. | 123/440 |
| 4,352,402 | 10/1982 | Collonia | 123/352 |
| 4,372,266 | 2/1983 | Hiyama et al. | 123/357 |
| 4,403,582 | 9/1983 | Yasuhara | 123/357 |

*Primary Examiner*—Magdalen Y. C. Moy
*Attorney, Agent, or Firm*—Bernard, Rothwell & Brown

[57] ABSTRACT

Fuel flow and/or engine speed is electrically controlled in accordance with a rate-of-change (acceleration or deceleration) value computed from one or more sensed parameters such as accelerator pedal position, throttle position, engine speed, exhaust temperature, intake manifold pressure, fuel temperature, etc. as well as stored engine parameters. A difference between a desired rate-of-change and a measured actual rate-of-change in engine speed is used to correspondingly change an engine control, for example a fuel control rack in a diesel engine fuel pump, a throttle valve in a carburetor, a timer for a fuel injection valve, a fuel valve to a turbine, or other control. The desired rate of change in engine speed may be critically damped, for example by multiplying by a percent or other fraction of a difference between a desired fuel flow and a present fuel flow, so as to avoid overshoot. The control may be operated in min-max, all-speed, cruise control or other special speed control modes, as well as incorporating altitude adjustment, pollution emission control, timing advance control, excessive speed control, fuel control recalibration, counting of selective numbers of pulses from a timing wheel with extension of time for slow speeds, manually selectable low idle adjustment, recordation of operation at excessive engine speed, operating time or other event, fuel consumption economy maximizing, and/or anti-tampering features.

In one particular application, the electronic control replaces a governor on a diesel engine and provides maximum power and torque control which may be changed by sensed changed operating conditions such as different transmission gear ranges. A standard computerized control can be employed for different engines with different engine parameters and manufacturing variations compensated by factors stored in ROM during final engine testing.

80 Claims, 25 Drawing Figures

Microfiche Appendix Included
(1 Microfiche, 83 Pages)

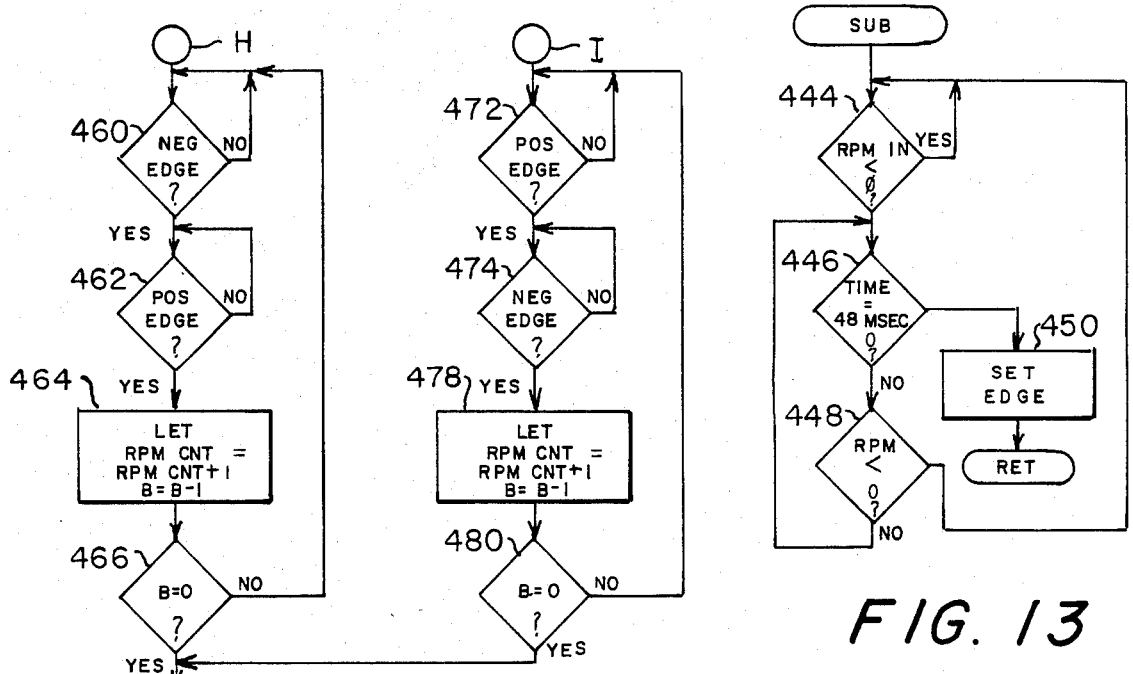
FIG. 13
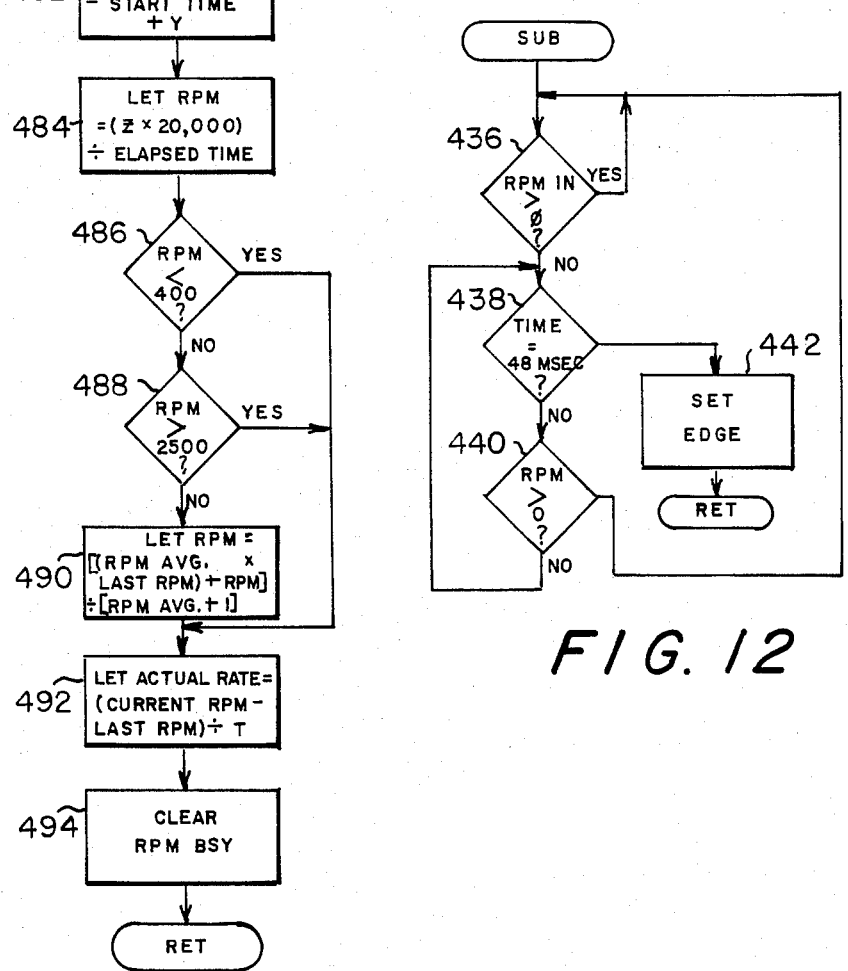
FIG. 11
FIG. 12

ENGINE CONTROL

REFERENCE TO MICROFICHE APPENDIX

Appended hereto is 1 microfiche containing 83 frames which are hereby incorporated in this application.

BACKGROUND OF THE INVENTION

1. Field of the Invention

The present invention relates to controls for prime movers or engines, and particularly to electronic controls for engines employed in vehicles or other applications where power and speed are to be managed in accordance with one or more factors such as operator demand, emission requirements, temperature, load, and/or other conditions.

2. Description of the Prior Art

One type of prior art control for controlling fuel flow, speed, torque and emissions of a diesel engine employs a fuel pump having a cam shaft driven by the engine for operating a plurality of injection pumps feeding fuel to the corresponding cylinders of the engine. The accelerator pedal is connected by linkage to a rack in the fuel pump which controls valves or port members associated with the injection pumps for controlling the quantity of fuel delivered by the injection pumps to the engine cylinders. A mechanical governor with a flyweight is driven by the injection pump cam shaft to control the positioning of a governor lever with a specially contoured limiting cam or cams in accordance with engine speed or rpm to limit the maximum rack position and thus the maximum fuel delivered to the engine; these governor cams are designed to produce selected maximum torque, power and emission characteristics. Additionally, the governor, upon engine speed or rpm exceeding a maximum safe speed, will move the lever to retract the rack to terminate or greatly reduce fuel flow to prevent damage to the engine. Fuel pumps with different governor cams must be manufactured and stockpiled in order to produce a desired variety of engines with different torque and power characteristics. Variations in dimensions and characteristics of cams, governors and fuel pumps under normal manufacturing techniques result in the requirement of extensive adjustments in the positioning of the levers and cams during final engine testing at several engine speeds in order to produce the desired engine characteristics and compensate for engine variations in manufacturing; adjustment of lever angle of position, for example, in a later step may necessitate repositioning of a cam or cams set in an earlier step. Additionally, these adjustments must also be done on governor replacements made in the field, i.e. when a new or reconditioned governor is installed on a pump.

Concern about pollution of the environment has resulted in requirements for engines to limit emissions of certain substances including incompletely burnt fuel which can be produced by sudden depression of an accelerator pedal and a large sudden increase in fuel delivery exceeding the fuel to air ratio necessary for complete combustion. In the above-mentioned type of diesel engine employing a rack controlling fuel delivery, one prior art emission control utilizes dampening facilities to prevent rapid advance of the rack. This necessarily reduces the maximum acceleration of the engine. Manufacturing tolerances needed to insure compliance with emission requirements result in a further reduction in maximum acceleration.

Tampering with the governor or its settings and/or emission controls in order to increase the maximum power speed and/or acceleration characteristics of the engine continues to be a problem in spite of sealing of the governor and providing warnings of dire consequences of tampering. Truck fleet companies select engine power characteristics designed to prevent or limit operation of the trucks at excessive speeds. Tampering with the governor and/or its settings and/or alteration or removal of pollution controls enables operation at higher speeds and acceleration to reach destinations sooner, but resulting in possible engine damage, more fuel consumption, violation of speed laws, and greater likelihood of accidents causing severe injury and death.

Operation of engines at higher altitudes requires lesser quantities of fuel to avoid exceeding the desired fuel to air ratio. The prior art includes devices for sensing an excessive exhaust temperature, which indicates an excessive fuel to air ratio, to operate devices mechanically limiting the maximum position and/or forcing retraction of a fuel pump rack to a position insuring a reduced fuel to air ratio.

Cruise controls, i.e. devices which will automatically maintain a set road speed to relieve the operator of the necessity to maintain a steady speed by means of the accelerator pedal, are available in the prior art. Such devices for the above-mentioned type of diesel engine are generally relatively expensive and require installation of additional equipment, e.g. devices to automatically operate the linkage from the accelerator pedal to the fuel pump in response to sensed vehicle road speed.

Emission control and fuel economy requirements, principally in gasoline operated automobiles, have resulted in the extensive development of electronic controls for engines, including computerized controls. Typically these systems regulate the air to fuel ratio to achieve optimum emission control and/or economy. Generally the computerized systems employ memory tables, and measured values such as engine speed and manifold pressure or throttle position, which correspond to air intake, to select a value corresponding to fuel quantity from a table. These looked-up values are typically used to determine the length of injection pulses applied to electrically operated fuel injection valves associated with corresponding cylinders of an engine. Other detected values, such as engine water or oil temperature, catalytic convertor temperature, altitude, air temperature, acceleration, deceleration, cranking voltage, and exhaust gas composition, have been suggested for use in modifying the values read from the tables or to define an additional table matrix or dimension. Interpolation between stored values has been employed in order to permit reduction in the size of tables. Also the prior art often selects spark ignition timing based upon stored table values and/or calculations made from various parameters. These prior art electronic control systems generally may be characterized as having one or more deficiencies such as being unstable or subject to periodic speed variation or hunting under certain speed, demand or load conditions; inability to reliably or promptly respond to varying demand or load conditions; requiring extensive memories to store multidimensional tables; requiring extensive data generation efforts; and/or other deficiencies.

Fuel controls for engines can generally be categorized as either "min-max" or "all-speed" systems. In min-max systems, such as in the above-mentioned prior art mechanical governor control system, the accelerator pedal controls the quantity of fuel delivery, or fuel pump rack position, between minimum (idle) and maximum levels which are determined by the governor in response to engine speed. In all-speed systems the accelerator pedal position corresponds to an engine speed and fuel delivery is varied to achieve that engine speed. For most vehicles such as automobile or truck applications, the min-max systems are preferred.

Prior art attempts to implement electronic or computerized controls for fuel controlled engines, such as diesel engines, and which provide acceptable vehicle driveability throughout the necessary entire wide range of drive and traffic requirements and within the constraints imposed by the engine design and the government emission requirements have generally been unsatisfactory. These prior art control systems generally have been subject to one or more deficiencies such as requiring an impractical large amount of expensive electronic equipment often too large to readily fit in available space within the truck, not being able to provide acceptable speed control throughout all of the many transient operating modes common to the operation of a truck, producing periodic speed variation (hunting) or surging in speed particularly at low speeds, resulting in engine stalling due to speed undershoot at low speeds, resulting in engine damage due to overspeeding such as that caused by overshoot, being undesired all-speed systems, being unsuitable for high pressure injection systems, etc.

Also, the prior art electronic or computerized controls wherein an engine is controlled by movement of a control member, for example the movement of a fuel control rack in a fuel pump, generally require sensing facilities for determining the positions of the control members to provide feedback to control movement. Where accurate positioning is required, such as is needed to control maximum power or torque in a diesel engine, the feedback systems generally must be relatively expensive high precision systems and/or require extensive calibration procedures during engine testing.

Fuel economy in prior art fuel control systems has been maximized by electrical, pneumatic and/or mechanical controls on the fuel pump governor operated by switches sensing gear shift position to limit fuel flow in one or more gear positions. Such prior art fuel maximizing systems have been relatively expensive as well as being susceptible to disablement and unreliability.

SUMMARY OF THE INVENTION

The invention is summarized in an electronic control which provides substantial improvements in management or control of prime movers or engines by including one or more features or aspects such as controlling the engine in accordance with a computed rate-of-change in engine speed; employing zero position control member recalibration; automatically returning a control member to zero position upon power failure or cutoff; using different maximum power curves for different conditions; using multiple ranges in sensing speed wheel slots or teeth; measuring speed wheel movement through an angle of rotation corresponding to an integer multiple of the angle of engine rotation between cylinder firings; using an extended speed measuring time for slow engine speeds; critically dampening control member movement by reducing a proposed movement parameter in accordance with a fraction derived from a difference between a previous condition value and a present condition value; recording critical events such as excessive overspeeding, tampering, or other event; providing manually selectable low idle speed adjustment; restricting operation to a lower torque and power upon sensing of an attempt to tamper with set parameters; and/or other features as described in the following description.

An object of the invention is to construct an electronic control for engines and the like providing improved reliability, response, and flexibility.

It is also an object of the invention to eliminate the requirement to stockpile many different controls, such as governors and fuel pumps, in order to meet the demand for engines with different operating characteristics.

Another object of the invention is to eliminate tendencies of electronic controls to overrun demanded engine speed, fuel flow or air flow conditions.

Still another object of the invention is to substantially reduce costs by substituting inexpensive and reliable electronic control components for more expensive mechanical controls.

One advantage of the invention is that a single standard electronic or computer control can be substituted for multiple different mechanical controls required in the prior art.

Another advantage of the invention is that substantially less adjustment and testing is required to order to manufacture an engine of desired operating parameters.

A further advantage of the invention is that pollution emission control can be achieved, for example by controlling the rate of fuel increase, by computer memory parameters which are relatively insusceptible to being removed or disabled and which require less manufacturing tolerance enabling greater maximum acceleration.

In accordance with one aspect of the invention, an electronic control for an engine utilizes rate of change values in order to control operation of an engine. An actual measured rate of change in engine operation may be substracted from a desired rate of change in order to produce a to be effected rate of change which can then be readily translated into a change in engine operating conditions necessary to bring about a desired future engine condition. This, for example, prevents increase in fuel supply to an engine which is already accelerating at a maximum acceleration rate to reduce any overshoot tendency.

In a second aspect of the invention, the lesser of a desired fuel flow value, as produced from a demand such as accelerator pedal position, and a maximum fuel flow value, as read from stored maximum power parameters is utilized to limit any increase in fuel flow in accordance with a desired acceleration in engine speed.

In a third aspect of the invention, a rate of change value selected from parameters stored in a computer memory is critically damped by multiplying the rate of change value by a fraction which is proportional to the difference between a desired engine condition and a present engine condition within a predetermined range of differences. This substantially prevents overshoot and results in dampening when engine conditions, such as speed, near the desired value.

In a fourth aspect of the invention, a control member is limited by a stop at a calibration position, and a computer program operating a computer provides for return of the control member to the stop and calibration position, when acceptable, to bring about recalibration of the control member position. This automatic recalibration eliminates the need for relatively expensive feedback systems and the like necessary in the prior art to operate control members, and makes possible the computer operation of a simple stepping motor combined with random access memory for storing a value corresponding to a number of forward pulses minus the number of reverse pulses applied to the stepping motor. This new control depending only on countable pulses for positioning a stepping motor relative to a mechanical stop in the pump to which the pump flow rates have become referenced in a calibrating procedure does not require further adjustments to compensate for manufacturing variations in governor components or to obtain specific fuel flows for different engine speeds.

In accordance with a fifth aspect of the invention, an electronic engine control has a plurality of different sets of stored maximum power parameters within a memory. The computer selects one of the sets of maximum power parameters in accordance with a sensed parameter, for example in accordance with a particular engine identifying code, a sensed gear position of a transmission, or a condition indicating that someone has been tampering with the electronic control.

In accordance with a sixth aspect of the invention, an electronic control for an engine provides for sensing the speed of the engine by a rotating member wheel having angularly spaced indications such as teeth or slots which are sensed by a computer counting a selected number of pulses, the number of pulses being counted being selected in accordance with a previous reading of the engine speed. Counting of less pulses is necessary for obtaining readings of speed at low engine speeds within allocated computer time, and sensing of larger numbers or pulses at higher engine speeds obtains greater accuracy necessary at the higher speeds.

In a seventh aspect of the invention, an electronic control for controlling an internal combustion engine having a plurality of cylinders which are successively fired includes a rotating disc with angularly spaced markers, such as teeth or slots, which are spaced so that an exact integer number of slots pass sensing means in each interval between successive cylinder firings, and pulses from the sensing means are counted in numbers selected to correspond to an integer number of successive cylinder firings. Such correspondence between engine speed sensing and cylinder firing eliminates errors resulting from variations in instantaneous engine speed at each firing.

In accordance with an eighth aspect of the invention, an electronic controller for an engine provides for engine speed measuring by counting a predetermined number of pulses from a sensor sensing the passing of indicating means such as teeth or slots or a rotating wheel wherein the pulses are counted by an interrupt procedure in a computer program called by a timer interrupt. The interrupt routine resets the timer and proceeds to count the pulses. If the selected number of pulses are not counted prior to a second interrupt, the counting period is extended. If a third interrupt occurs prior to completion of the counting, engine speed is determined by the number of pulses and pulse edges counted. This procedure ensures accurate and reliable engine speed data necessary for proper control of the engine.

In accordance with a ninth aspect of the invention, engine operation is controlled by a computer sensing the position of accelerator means. Engine speed is controlled between a low idle speed which is manually selected from a plurality of possible low idle speed settings and a high idle speed preventing engine damage.

In accordance with a tenth aspect of the invention, the reset of the computer controlling the operation of an engine and an initializing procedure is brought about by the sensing of a battery voltage below a predetermined value selected to be above battery voltage during initial starter motor energization but to be below battery voltage during subsequent engine rotation during starting. This has the added advantage of ensuring resetting and initializing of the controller in the event of power loss as well as at the initiation of a starting procedure.

In accordance with an eleventh aspect of the invention, an engine control member is operated by an electrical rotary stepping motor driving a screw and a rotary return spring biases the stepping motor to retract the control member to a zero position. An electrical drive circuit applies electrical bias to the stepping motor to hold the stepping motor against the spring bias so that upon loss of electrical power the control member is returned to the zero position. Disablement of the electronic control is discouraged by the automatic return of the control member to the zero position.

In accordance with a twelveth aspect of the invention, an electronic computer control includes an electrically eraseable programmable read only memory device together with a program for recording a significant engine event in the device. Significant engine events may include a sensed tampering, an engine damaging overspeed condition, engine run time, or other condition or event.

In accordance with a thirteenth aspect of the invention, stored memory parameters corresponding to advance and retard control rates are selected in accordance with a demand value being greater or less, respectively, of an existing engine operating value, for example an accelerater pedal position being greater or less than a corresponding fuel pump rack position. The use of separate advance control rate parameters and retard control rate parameters enables proper advancement or retraction of an engine operating parameter, such as fuel flow, by the appropriate value, and enables limits such as high and low idle limits on the corresponding advancement and retraction.

Additional features of the invention include the automatic cutoff of fuel during loss of electrical power or excessive engine speed, the inexpensive incorporation of automatic engine speed or cruise control without requiring additional control devices, maximum fuel cutback for operation at higher altitudes, critically dampening rate of fuel change at minimum and maximum engine speeds, and electronic control for special functions such as engine braking, power takeoff, or turbo unload.

Other objects, aspects, advantages and features of the invention will be apparent from the following description of the preferred embodiment taken in conjunction with the accompanying drawings.

BRIEF DESCRIPTION OF THE DRAWINGS

FIG. 11 is a logic flow diagram of a second portion of the computer program subroutine for obtaining engine speed and accelerator pedal position.

FIG. 12 is a logic flow diagram for a computer program subroutine for detecting a negative voltage edge from a speed sensor.

FIG. 13 is a logic flow diagram of a computer program subroutine for detecting a positive voltage edge from a speed sensor.

DESCRIPTION OF THE PREFERRED EMBODIMENT

Figure 1:
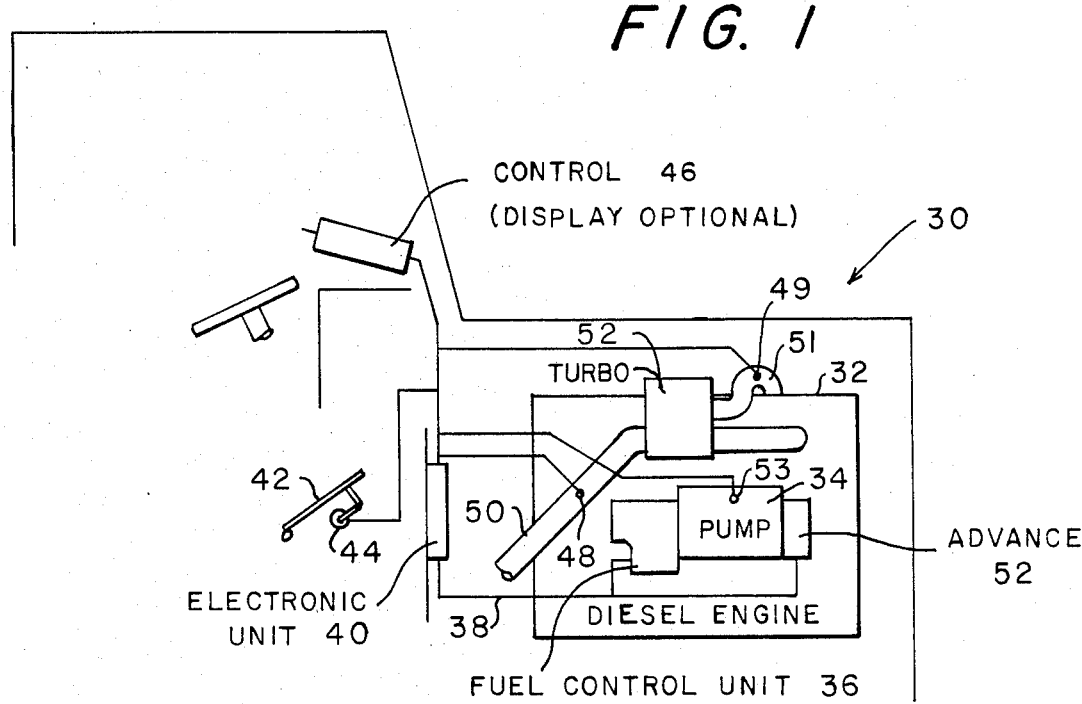
FIG. 1 is a diagrammatical, sectional illustration of a portion of a truck with a diesel engine and electronic control in accordance with the invention.

As illustrated in FIG. 1, one embodiment of the present invention includes a truck indicated generally at 30 having a diesel engine 32 with a fuel pump 34 which directs diesel fuel to the respective cylinders of the engine 32. The conventional governor of the pump 34 is replaced by a fuel control unit 36 which is connected by a multiple conductor cable 38 to an electronic unit 40. An accelerator pedal 42 is suitably linked to a potentiometer 44 which is connected to the electronic unit 40 along with a control panel 46 mounted on the dash within the cab of the truck. Additionally, a temperature sensor 48 is mounted in the exhaust pipe 50 of the engine 32, an air pressure sensor 49 is mounted in the engine intake manifold 51 charged by turbo charger 52, a fuel temperature sensor 53 is suitably mounted in the pump unit 34 for sensing fuel temperature, and an electrically controlled timing advance control unit 52 is included in the drive for the pump 34, all connected to the electronic unit 40. The electronic unit 40 in response to sensing the position of the accelerator pedal 42 and other operating conditions operates the fuel control unit 36 to control the quantity of fuel dispensed by the pump 34 to the cylinders of the diesel engine 32 to control the engine.

Figure 3:
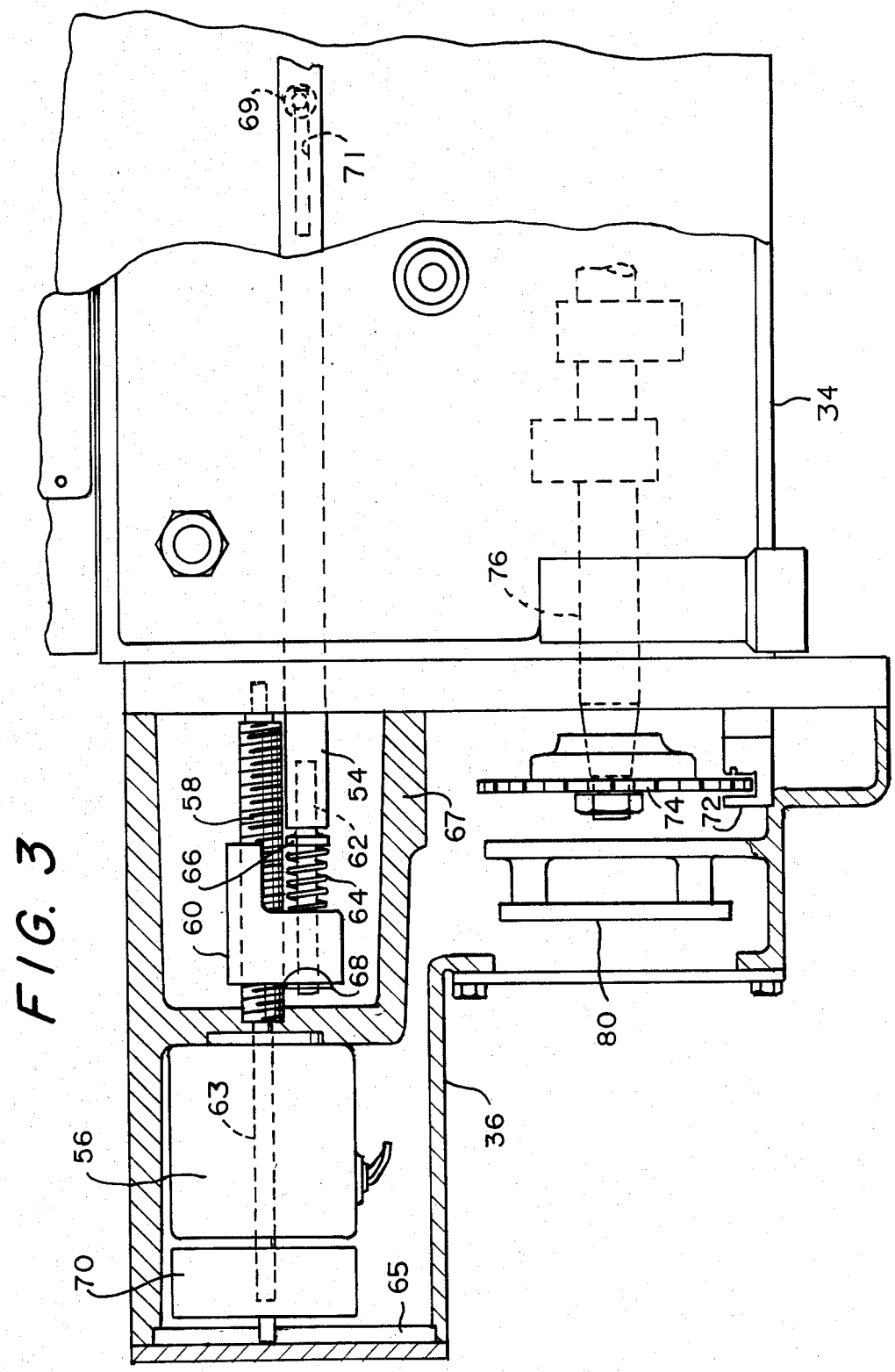
FIG. 3 is a sectional view of an assembly for replacing the governor on a diesel injection pump.

As shown in FIG. 3, the fuel pump 34 contains a rack member 54 extending into the control unit 36 and which is movable in an advance direction, to the right as viewed in FIG. 3, to rotate helix sleeve members (not shown) variably closing side ports of piston pumps (not shown) for supplying corresponding variable quantities of fuel to the corresponding cylinders of the diesel engine in a conventional manner. When the pump rack 54 is moved to the extreme left as viewed in FIG. 3, the pump helix members are rotated to expose the piston side ports for the full piston stroke to terminate fuel flow to the engine. A stepping motor 56 mounted in the unit 36 rotatingly drives a screw 58 on which a arm member 60 is threaded. A shaft 62 has one end fastened to the protruding end of the rack 54 and has its other end slidingly passing through a bore in the arm member 60. A compression spring 64 extending around the shaft 62 engages the arm 60 at one end and engages a collar 66, which is mounted on the shaft 62 for urging a stop member 68 mounted on the end of the shaft 62 protruding from the rear of the arm 60, into engagement with the arm 60. A return rotary spring assembly such as a spiral clock spring 70 has its spring attached at one end to the shaft 63 of the motor 56 and has its other spring end attached to the spring housing which is secured against rotation, for example by pin 65. The spring 70 is wound to bias the shaft 63 to return screw 58 and arm 60 to the retracted position to retract the pump rack 54 when electrical power is removed or lost from the motor 56.

A housing wall 67 separates and seals off the area containing the member 60 and screw 58 to prevent oil from bathing the electrical components. The member 60 and screw 58 are preferable formed from a non-magnetic material, such as aluminum and/or non-magnetic stainless steel, to prevent attraction of iron filings and the like which could cause the member 60 to bind on the screw 58.

A screw 69 is secured in a suitable threaded bore in the pump housing and has a pin end which extends into a slot 71 formed in the rack 54 for limiting rack movement between zero and maximum fuel flow positions. The pin 69 and slot 71 are conventional features on prior art fuel pumps; however prior art mechanical governors generally employ a separate stop and/or cams for limiting rack movement between low idle and high idle fuel flows. These prior art stops and/or cams require extensive adjustment procedures during final engine testing and which are eliminated by the present electronic control which utilizes the conventional rack stop 69 as a reference point for rack movement and calibration. The sping return 70 ensures that the rack 54 returns to the stop 69 and zero fuel flow upon engine shutdown or upon any loss of electrical power since the stepping motor 56 must be maintained in an energized condition in order to overcome the bias of the spring 70 and hold the rack 54 in a fuel flow condition. Prior art fuel flow cutoff to cause engine shutdown generally required separate facilities such as a pull wire or an electrical or pneumatic control to override the governor and return the rack to its zero fuel flow position.

The unit 36 also contains a sensor such as a Hall effect sensor 72 which generates a magnetic field and detects changes in field strength from angularly spaced markers or slots in a disk 74 to produce corresponding voltage changes in a signal produced by the sensor 72. The disk 74 is mounted on the end of the cam shaft 76 which operates the pumps in the pump unit 34. The cam shaft 76 is normally driven by the crank shaft of the diesel engine 32 to operate the pump 34 and pump fuel to the engine cylinders in synchronism with rotation of the engine crank shaft (not shown), the relative timing of cam shaft 76 is adjusted by the advance mechanism 52 of FIG. 1.

The number of markers or slots in the disk 74 is selected to produce the same integer number of pulses from the sensor during the interval from each cylinder firing to the next cylinder firing. This number is particularly selected to be an integer multiple of the number of cylinders; e.g. for a six cylinder engine the disc 74 has 6, 12, 18, 24, or nx6 evenly angularly spaced slots or land areas between slots so that an integer number of teeth or slots pass the sensor between successive cylinder firings. Larger numbers of slots or teeth reduce RPM measurement latency in engine speed readings, but the number of slots is limited by the ability of the sensor 72 to detect the slots or teeth. In one embodiment, a disk about 4.2 inches (105 mm) in diameter having 18 slots or teeth has been found suitable. Producing the same integer number of pulses over each interval between cylinder firings enables counting of a corresponding integer number of pulses to avoid speed measurement variations due to instantaneous acceleration during each cylinder firing.

Figure 4:
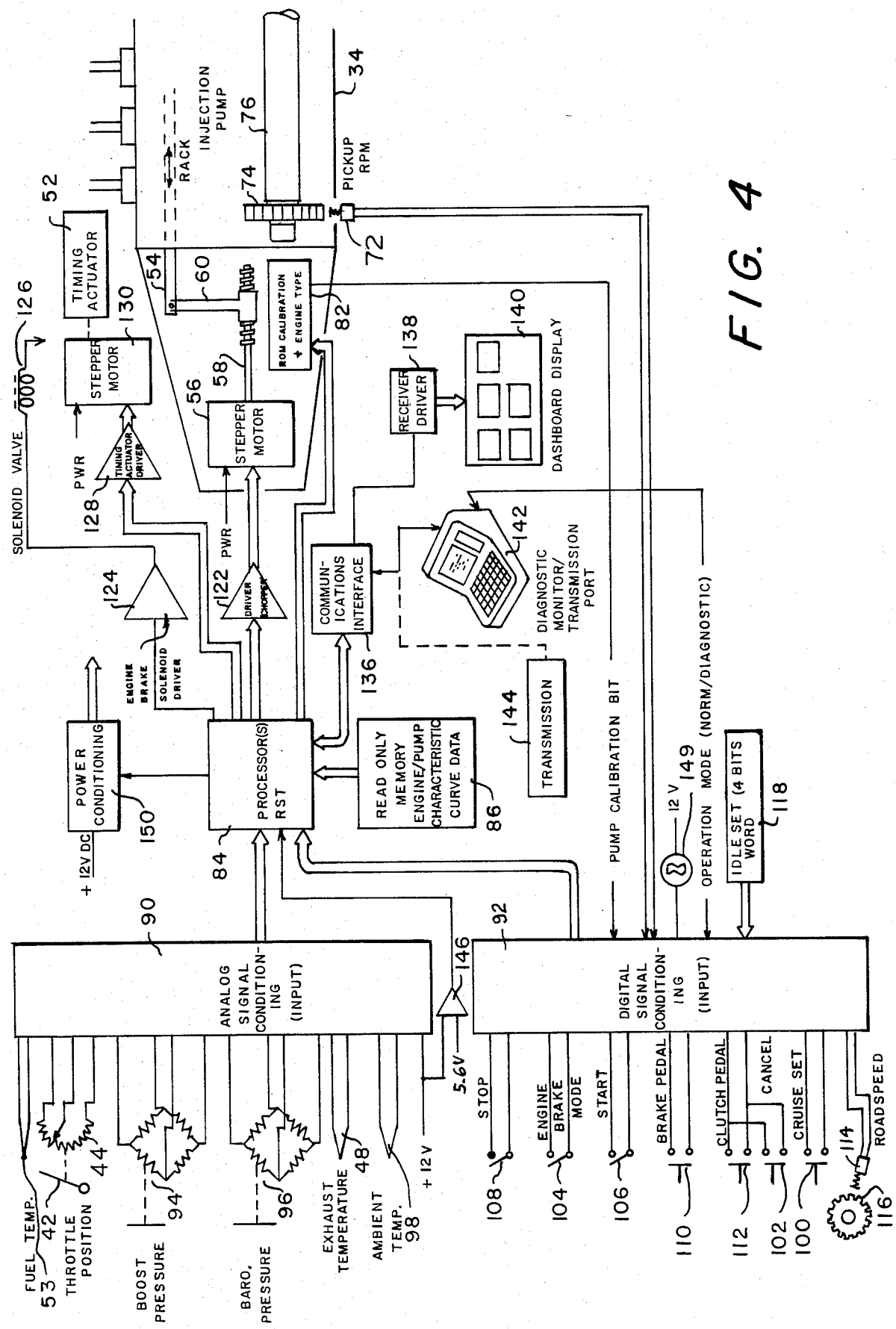
FIG. 4 is a schematic diagram of an electronic control system for a diesel engine in accordance with the invention.

Additionally the unit 36 contains a circuit board 80 which includes suitable electronic circuitry including a read only memory (ROM) 82, FIG. 4, which contains data regarding the engine type and, additionally if needed, calibration data of the particular fuel pump 34. The circuit board 80 further includes conventional circuitry (not shown) for reading the data from ROM 82, for example a register for reading the ROM and serially outputting the data in response to clock pulses.

The electronic fuel control, as shown in FIG. 4, includes a computer facility 84 adapted to read the information from the ROM 82 and additional ROM 86 containing additional data for operating the fuel control. The potentiometer 44 sensing the position of the foot throttle 42, the thermocouple 48 sensing the exhaust temperature, and the fuel temperature sensor 53 are joined by analog signal conditioning circuitry 90 to the computer unit 84. Similarly the Hall effect pickup 72 for sensing engine speed is connected by digital signal circuitry 92 to the computer unit 84. Additionally analog sensing devices connected by the circuitry 90 to the computer 84 include a booster pressure sensing facility 94, a barometric pressure sensing facility 96, and an ambient temperature sensing facility 98. Additional digital inputs include a cruise set switch 100, a cruise cancel switch 102, an engine brake mode set switch 104, a start switch 106, a stop switch 108, a brake pedal switch 110, and a clutch pedal switch 112 connected by the digital signal conditioning circuitry 92 to the computer circuitry 84. A pickup device 114 may be included to detect road speed, for example, a timing disc or gear 116 driven by the output of the transmission. A switching facility, such as a thumb wheel switch 118 or the like, is connected to the digital circuitry 92 enabling the idle speed to be set for the engine; this enables selection of the optimum or desired engine idle speed.

An output of the computer circuitry 84 operates a driver circuit 122 which drives the stepper motor 56; the driver 122 supplies sufficient electrical holding current to the stepping motor 56 to hold the motor 56 aginst the bias of the spring 70 until power is cut off. Additional computer outputs may be connected to an engine brake solenoid driver 124 which drives a solenoid valve 126 operating a conventional engine brake facility such as DYNATARD ™ system from Mack Trucks, Inc. A timing actuator driver 128 operates a stepper motor 130 which controls the advance mechanism or timing actuator 52. The output of the computer circuitry 84 also is applied by communications interface circuitry 136 generating serial outputs which go to receiver-driver circuitry 138 operating the dashboard display 140 and to a diagnostic monitor 142 which is only connected to the unit during diagnostic testing or setup of the system. Optionally the serial output to the diagnostic monitor 142 from the interface 136 may be connected to the transmission 144 for sensing its operation and/or for controlling the operation thereof. When the diagnostic monitor is connected to the system a connection is also provided to the digital circuitry 92 for appropriately indicating the diagnostic condition to the computer circuitry 84.

Figure 2:
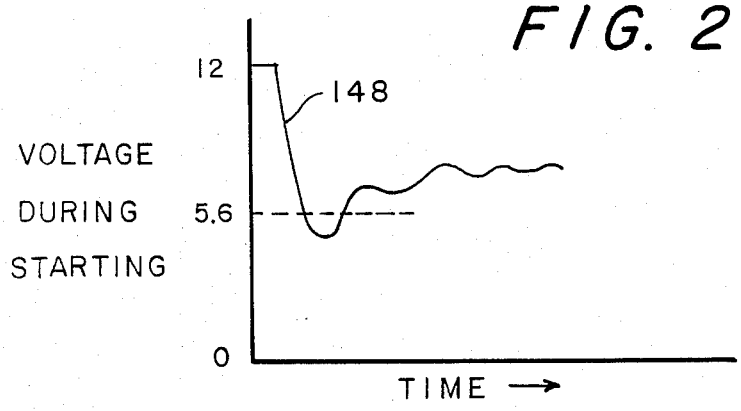
FIG. 2 is a graph of the battery voltage during starting of the engine of FIG. 1.

Starting voltage detection facilities such as a voltage comparator 146 is connected between the 12 volt battery and reset circuitry for the computer circuitry 84 to initialize operation thereof. Referring to FIG. 2, the battery voltage, as illustrated by the curve 148, initially drops to a low voltage of about 5 volts during a starting cycle. After cranking movement of the engine has been initiated, the battery voltage will increase above the initial low level value until the engine starts. The reference voltage to the voltage comparator 146 is set to detect the initial low voltage during the beginning of cranking to operate the reset of the computer circuitry 84. Additionally the computer will be reset every time the 12 volt voltage is turned off by the operator key. Thus every time the engine is started the computer circuitry 84 is reset.

Operation of the stop switch 108 initiates a stop procedure for the control. In addition to, or in place of, the stop switch 108, switch 12v power from the key switch 149 connected to the digital conditioning circuitry 92 is used to indicate a stop condition to the computer circuitry 84. Power conditioning circuitry 150 is operated by the computer circuitry 84 when the stop condition is sensed, to turn off power to various circuits to conserve battery power. The spring return 70, FIG. 3, returns the rack 54 to the zero position to terminate fuel flow and to stop the engine.

Figure 5:
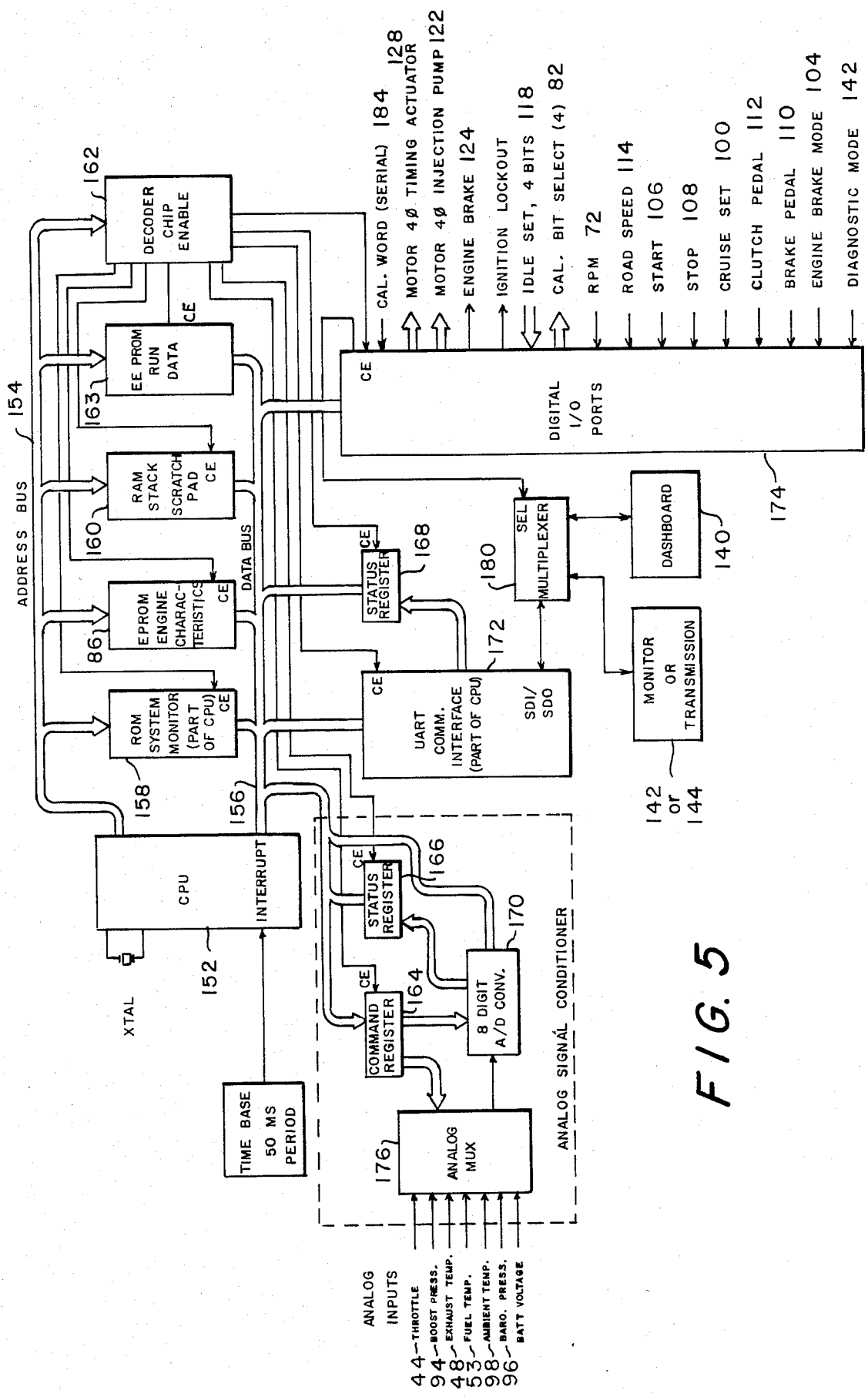
FIG. 5 is a detailed diagram of a portion of the electronic control shown in FIG. 4.

A detailed diagram of the circuitry of the processing computer 84 as well as the analog circuitry 90 and digital circuitry 92 is illustrated in FIG. 5. The computer includes a microprocessor 152 such as Intel 8051 which has address outputs connected to an address bus 154 and input/output lines connected to data bus 156. The address lines 154 are connected to address inputs of the eraseable programmable read only memory (EPROM) 86, system ROM 158, random access memory (RAM) 160 for stack and scratch pad purposes, electrically eraseable programmable read only memory (EEPROM) 163 and a decoder chip 162 utilized for enabling various components. The data bus 156 is connected to data inputs and/or outputs of the EPROM 86, the ROM 158, the RAM 160, EEPROM 163, command register 164, status registers 166 and 168, eight-digit analog to digital converter 170, universal asynchronous receiver/transmitter (UART) 172, and digital input/output port chip 174. Outputs of the decoder chip 162 are connected to enable inputs of the EPROM 86, ROM 158, RAM 160, command register 164, status registers 166 and 168, the UART 172 and the digital input/output port chip 174. An analog multiplexing chip 176 has inputs from the throttle potentiometer 44, the boost pressure sensor 94, the exhaust temperature sensor 48, a fuel temperature sensor 53, ambient temperature sensor 98, barometric pressure sensor 96 and the battery voltage. Address inputs of the analog multiplexer 176 are controlled by the command register 164 to apply the corresponding input to an output line connected to the analog-to-digital converter 170. The status digital output of the analog-to-digital converter 170 is connected to data inputs of the status register 166. The serial input/output of the UART 172 is connected by multiplexer 180 to the monitor 142 or transmission 144, and the dashboard 140. One output of the digital input/output device 174 controls communication port selection by multiplexer 180 to the UART 172. Additionally digital outputs of the UART 172 are connected to data inputs of a status register 168. The inputs from the engine speed sensor 72, road speed sensor 114, start switch 106, stop switch 108, cruise set switch 100, clutch pedal switch 112, brake pedal switch 110, engine brake mode switch 104 and diagnostic mode switch 142 along with a serial calibrating word generator 184 are connected by the digital input output ports 174 to the data bus 156 for use by the CPU 152.

A program for operating the fuel control system is illustrated in FIGS. 6, 7, 8, 9, 10, 11, 12 and 13. Initially with the power off, the microprocessor 152 is stopped by the signal applied from voltage comparator 146, FIG. 4 to the reset input of the processor. When the power is turned on, the microprocessor resets to point A, FIG. 6, in the program which is the power-on step 202. From power on, the program proceeds to an initializing system step 204 where various initializing procedures are performed. These initializing procedures include the turning of the power conditioning circuit 150 on, the resetting or zeroing of various parameters stored in RAM, resetting digital input and output ports and UART devices, setting up a timer and timer interrupt for a 50 millisecond cycle, and applying a series of retract pulses to the stepping motor 56 to ensure that no fuel is being pumped to avoid any runaway condition of the diesel engine.

Figure 16:
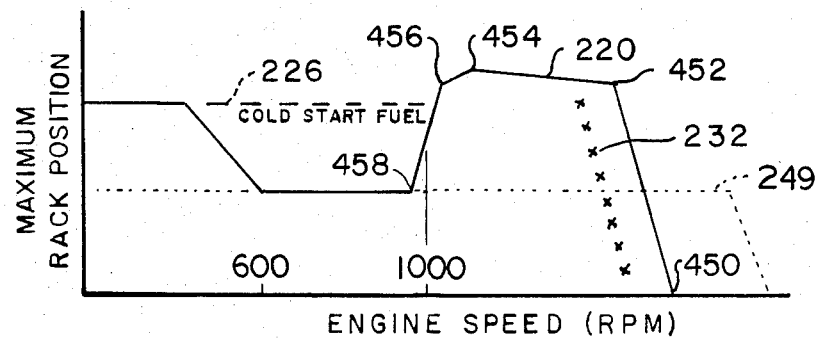
FIG. 16 is a graph with four curves illustrating stored data of maximum permissible rack advancement under respective different operating conditions for varying engine speed.
Figure 17:
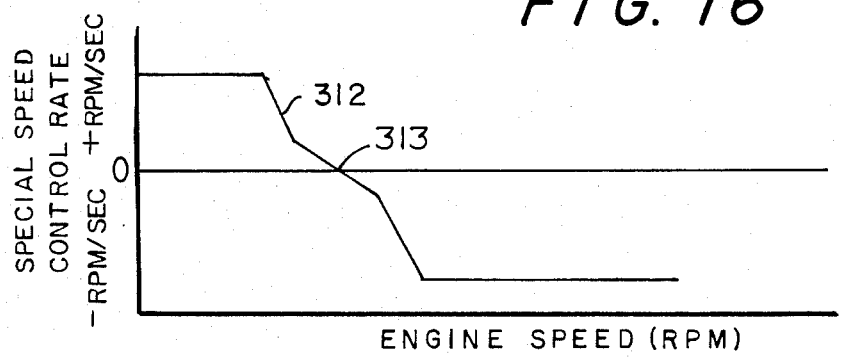
FIG. 17 is a graph illustrating stored data of speed control rate of change in engine speed relative to a special or set engine speed.
Figure 21:
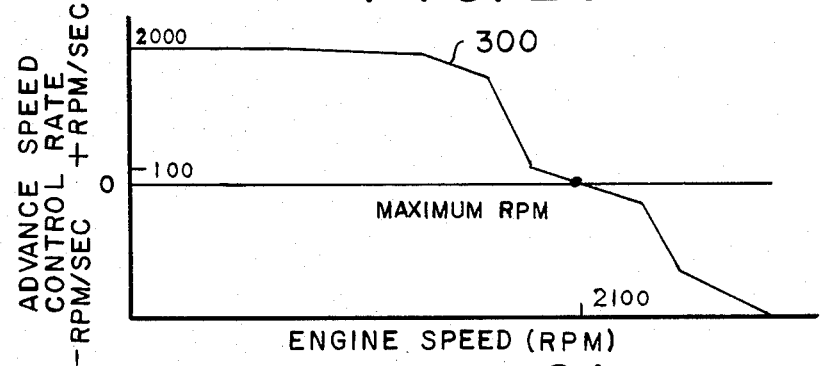
FIG. 21 is a graph illustrating stored data of permissible advance control rate relative to existing engine speed.
Figure 22:
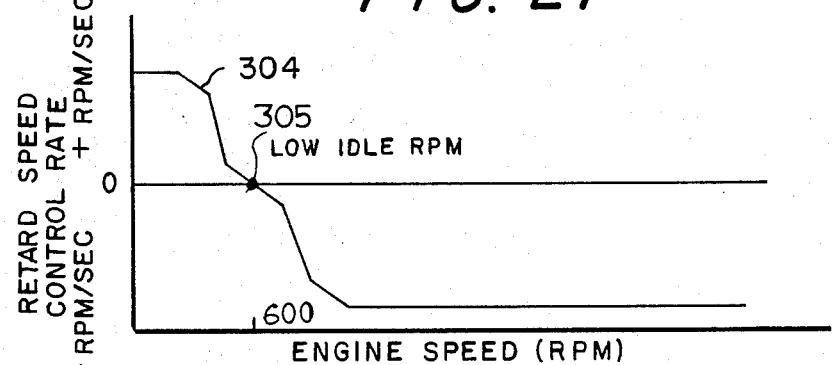
FIG. 22 is a graph illustrating stored computer data of permissible retard control rate relative to existing engine speed.

After the system has been initialized, the program proceeds to step 206 where the data in the ROM 82 containing calibration factors and the engine type are read by the microprocessor and used to establish data tables in RAM 160 or to set up pointers to the appropriate tables. The tables for various engine types are found in EPROM 86, and the appropriate data corresponding to the engine type identified by the ROM 82 is utilized in setting up or identifying the appropriate data tables. In one embodiment which does not include the EEPROM 163, the appropriate tables for the identified engine are read from EPROM 86 and stored in a base file in RAM 160 each time that the program passes through step 206. These include data tables represented by one or more maximum power curves 220 (FIG. 16), speed control curve 312 (FIG. 17), advance rate control curve 300 (FIG. 21), retard rate control curve 304 (FIG. 22) and allowable steps curve 320 (FIG. 23) as well as other data. The copying can include two or more maximum power curves 220 for operating a vehicle in corresponding different gear ranges. The calibration factors stored in the ROM 82 are utilized to adjust one or more of these data tables in RAM in accordance with the particular characteristics of engine 32 and the pump 34 as determined in calibrating and testing of the engine and pump during manufacture. For example the maximum rack positions of curve 220 in the base file may be adjusted up or down by a small factor, such as one or two percent, where the calibration factors indicate such adjustment is to be made. Additionally the system will read the idle set word facility 118 to set the low idle speed information in the tables, for example the speed values in the table represented by curve 304 in FIG. 22 are adjusted so that the low idle RPM 305 will be in accordance with the idle word read from device 118.

In another embodiment utilizing the EEPROM 163, the sensing of a zero state in the EEPROM corresponding to the absence of a stored engine identification code causes the program, on a first use or test of the control, to read the appropriate tables from EPROM 86 and write them in a base file in EEPROM 163 along with the entire identifying code. On subsequent runs or start-ups, the program compares the engine identification code in EEPROM 163 with the engine identification code in ROM 82, and if they do not coincide, the program rewrites the EEPROM 163 with the tables relating to the lowest power curves as well as recording an indication in EEPROM 163 that there has been tampering. This is designed to discourage tampering by changing the engine identifying code in ROM 82.

The storage of different data tables in EPROM 86 for the different engines enables use of a single computerized circuit for different engine types and different pump types. The only difference between control systems for the different types of engines and different types of pumps will be the information which is stored within the ROM 82 which may be preset or set during final engine test.

After the data tables have been set up in step 206, the program proceeds to 208 where the presence of a valid engine speed reading, for example by means of a flag, is detected. If an engine speed reading has not been made since initialization of the system, the program recycles through step 208 until such a reading is made.

Figure 10:
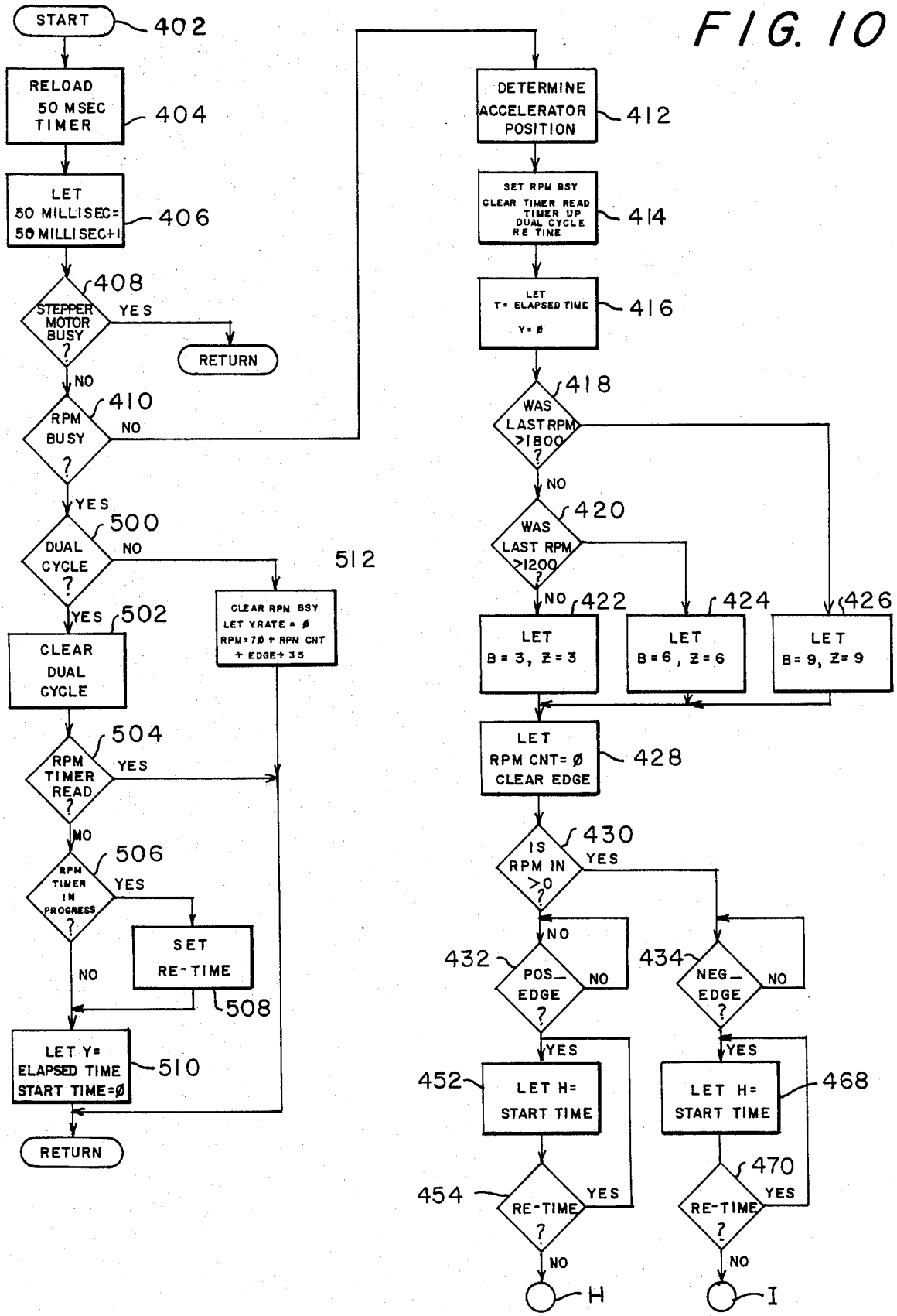
FIG. 10 is a logic flow diagram of a first portion of a computer program subroutine for obtaining engine speed and accelerator pedal position.

A subroutine for determining engine speed is illustrated in FIGS. 10 and 11, and is called by means of an interrupt generated by the computer timer every 50 milliseconds. The subroutine starts at 402 proceeding to step 404 where the computer timer is reset to count down for another 50 second period. In step 406 a one byte memory location is incremented to keep count of the number of 50 second intervals which have been called. If a stepping motor busy flag is set indicating that the computer is advancing or retracting the stepper motor 56, the program in step 408 will return to the stepping motor operating procedure. In the next step 410, an RPM busy flag is sensed; the RPM busy flag indicates that the computer is in the present subroutine doing a reading of the engine speed which can take longer than the 50 millisecond period of the computer timer.

When the RPM busy flag is clear, the program proceeds from step 410 to step 412 where the program reads the accerelerator pedal position. In the next step 414, the RPM busy flag is set, and timer read, timer up, dual cycle and retime flags are cleared. The elapsed time from the last RPM reading as indicated by the last recorded setting of the RAM counter of step 406 and the present reading of the counter of 406 is calculated in step 416 for later use in determining an acceleration value. Steps 418 and 420 are employed to selectively branch to step 422, 424, or 426 depending upon whether the last RPM reading was less than 1200, between 1200 and 1800 or greater than 1800, respectively. The slots in the disk 74 of FIG. 3 pass the sensor 72 at different rates for different RPM, and it is desirable to count more slots in order to obtain more accurate speed readings, but at lower speeds the counting of a larger number of slots cannot be performed within allocated computer time, i.e. within the 50 ms time period leaving sufficient time to proceed through the main program. Thus at higher RPM, step 426 sets the count at 9 slots or teeth, at RPM between 1200 and 1800, step 424 will set the program to count only 6 slots, and in step 422 the program is set to count only 3 slots.

The number of teeth to be counted is selected to correspond to an integer number of cylinder firings so that each counting period will extend over the same corresponding number of cylinder firings. For example in a six cylinder engine with a timing disk having 18 slots, the count must be an integer multiple of 3, i.e. 3, 6, 9, etc. This prevents the speed readings from varying due to acceleration and deceleration occuring during and before each cylinder firing.

From steps 422, 424 or 426 the program proceeds to step 428 where the RPM count and edge indications are cleared. In step 430, the presence of a relative negative signal from the sensor 72 of FIG. 3 results in the program proceeding to step 432 and the presence of a positive signal from sensor 72 results in branching to the step 434. In steps 432 and 434 the program detects positive and negative edges of voltage change, respectively.

Subroutine procedures for detecting the negative and positive edges of voltage from the sensor 72 are illustrated in FIGS. 12 and 13, respectively. In step 436, the program continuously recycles until the voltage becomes positive whereupon the program then proceeds to cycle through steps 438 and 440. In step 438 the passage of a time of less than 48 microseconds from the detection made in step 436 results in the program proceeding to step 440 where the existence of positive signal from the sensor 72 is detected to return the program to step 438. If the positive signal is not detected in step 440, the program reverts to step 436 indicating that the positive signal was due to spurious noise or signals picked up in the leads or other equipment. If the positive signal is maintained for more than 48 microseconds, the program proceeds from step 438 to step 442 where the edge is set and the program returns to the calling procedure. The steps 444, 446, 448 and 450 of the subroutine of FIG. 13 are substantially similar to the corresponding steps 436, 438, 440 and 442 of FIG. 12 except that in steps 444 and 448 a negative voltage is detected rather than the positive voltage of steps 436 and 440. The procedures of FIGS. 12 and 13 substantially reduce false RPM readings due to spurious voltage signals.

The branching from step 430 enables use of alternative procedures for using either the leading or trailing edge of timing wheel slots or teeth to count the slots or teeth. Positive going pulse edges will be used if the next edge to be sensed is a positive going edge, and negative going pulse edges will be used if the next edge to be sensed is a negative going edge. At low engine speeds, there is a large time period between negative and positive going pulse edges. The use of alternative procedures reduces the time needed for speed measurement by eliminating the need to wait past the next pulse edge if it is the wrong polarity to begin the count.

From step 432 of FIG. 10, the program proceeds to step 452 where the start time of the edge or slot counting procedure is stored. In the next step 454, a true retime flag recycles the program through step 452; the retime flag indicates that the program was interrupted while in the process of reading the time in step 452 thus necessitating that the start time be reread. If the retime flag is clear, the program proceeds to step 460 where the subroutine of FIG. 12 is called to detect a negative edge and then to step 462 where the subroutine of FIG. 13 is called to detect a positive edge. From step 462, the program goes to step 464 where the RPM count is incremented and the number of counts to be made is decremented. In the following step 466 if the number of counts to be taken is greater than zero, the program proceeds back to step 460 to detect another count.

The procedure from step 434 of FIG. 10 includes steps 468, 470, 472, 474, 478 and 480 substantially similar to the corresponding steps 452, 454, 460, 462, 464 and 466 except that the steps 472 and 474 detect positive and negative edges respectively rather than the negative and positive edges of the steps 460 and 462.

After the program has completed the count, it proceeds from step 466 or step 480 to step 482 where the elapsed time is calculated by the stop time minus the start time plus the time represented by the number of 50 millisecond cycles that have transpired from the beginning of the read cycle. In step 484 the computer calculates the RPM based upon the count and the elapsed time. The following steps 486 and 488 detect an RPM reading between 400 and 2500 RPM to branch to step 490 where the present RPM reading is averaged with a value corresponding to a last RPM calculation. This previous RPM value is multiplied by a value RPM avg in order to reduce the weight given to the present reading and to reduce variations in RPM readings resulting from slight dimensional variations of the slotted disk 74. If the RPM reading is less than 400, the engine is in a starting mode accelerating rapidly so that the RPM need not be averaged, and if the RPM is greater than 2500, the RPM is above the maximum speed limit at which the engine can be operated without damage and averaging should not occur to lower the RPM reading and prevent immediate remedial action by the program.

From step 490 or steps 486 and 488, if the RPM is less than 400 or greater than 2500, the program proceeds to step 492 where acceleration is calculated based upon dividing the difference between the current RPM and the previously calculated RPM by the elapsed time determined in step 416, i.e. the sum of the 50 ms time periods that have elapsed between the start of the previous and present readings. From step 492 the program proceeds to step 494 where the RPM busy flag is cleared and the program returns to the calling procedure.

Referring back to FIG. 10, the program in step 410 will detect a busy flag as set by step 414 indicating that the program was in the process of conducting an RPM reading when the timer interrupt occurred. This occurs at low RPM rates less than about 400. If the RPM flag is busy the program proceeds to step 500 where the presence of a dual cycle flag set in step 422 is detected. When the dual cycle flag is true, the program proceeds to step 502 where this flag is cleared and then to step 504 where a RPM timer read flag is detected. The timer read flag is set after completion of successful read of the clock in step 452 or 468. If the program had proceeded past steps 452 or 468 during the initial read, the program returns to the point of interrupt to allow the detection of additional edges for an additional 50 millisecond period. This enables a reading over a 100 millisecond period at low RPMs to obtain a more accurate RPM reading. If the timer read flag is found false to step 404, the program proceeds to step 506 where a timer in progress flag is detected. The timer in progress flag is set at the beginning of the steps 452 and 468 indicating that the program is reading the start time. If an interrupt occurs in the middle of one of the timer reading cycles 452 and 468, the reading or start time can be false thus giving an erroneous RPM reading. Thus if the timer in progress flag of step 506 is true, the program proceeds through step 508 where the retime flag is set causing the program in steps 454 and 470 to return to steps 452 and 468 to reread the start time prior to continuing with the sensing of additional edges. From step 506 or 508 the program proceeds to step 510 where elapsed time is set to 50 milliseconds and the start time is set to zero prior to executing a return to the program at the point of interrupt.

If another interrupt occurs prior to the program passing the step 494 where the RPM busy signal is cleared, the program in step 500 will branch to step 512 where a calculation of RPM is made by any count which may have been read and any edges that may have been sensed. This calculation will represent a rough estimate of a very low RPM. Actual rate-of-change or acceleration will also be set to zero since at low RPM wide inaccuracies in the acceleration values would result in incorrect to-be-effected rate-of-change values. In step 512 it is also necessary for the program to pull the stored interrupt data from the stack so that upon passing from step 512 to a return from interrupt the program may exit from the subroutine of FIGS. 10–13 and return to the point of the original interrupt in the main program.

Referring back to FIG. 6, the sensing of a valid RPM reading in step 208 permits the program to proceed to step 210 where the program recycles to step 208 until engine speed is greater than zero. Once the engine begins to rotate during starting or cranking and an engine speed greater than zero is detected, the program proceeds to step 212 where a number of pulses, previously determined in accordance with data established from step 206, are applied to advance the stepping motor 56 and the rack 54 to initially begin feeding fuel from the fuel pump to the engine.

With fuel being supplied to the engine, the program has reached point B which is the point at which the program begins recycling through normal operating procedures. The first step 216 in the normal operating cycle is to test for a valid RPM or engine speed reading. Normally this reading will be valid, but at later steps in the program, the valid RPM reading flag may be invalidated to force a new RPM reading prior to cycling through the program.

In step 218 the operating parameters of the program are set up. The engine operation is controlled under maximum rack or fuel characteristics found in a working or second file in RAM. This maximum fuel working file is set up initially by copying data as represented by curve 220 from the base file established in step 206, and is similarly set up again in subsequent passes through step 218 when an indicator or flag is sensed that the working file as been changed and/or it is necessary to again set up the working file. Additionally where separate power curves are utilized for corresponding different gear ranges, the particular gear will be identified, such as from the road speed and engine speed readings (with a road speed greater than zero the ratio of road speed to engine speed can be used to determine the gear in accordance with stored parameters for the particular vehicle), and the appropriate maximum fuel data will be set up in the working file. Further requests for cancellation of a special speed mode, such as by sensing the operation of an appropriate switch (for example, operation of the cancel switch 102, the brake pedal switch 110 or the clutch pedal switch 112 requesting cancellation of the cruise control mode) cause resetting of the corresponding special speed mode flags.

Figure 24:
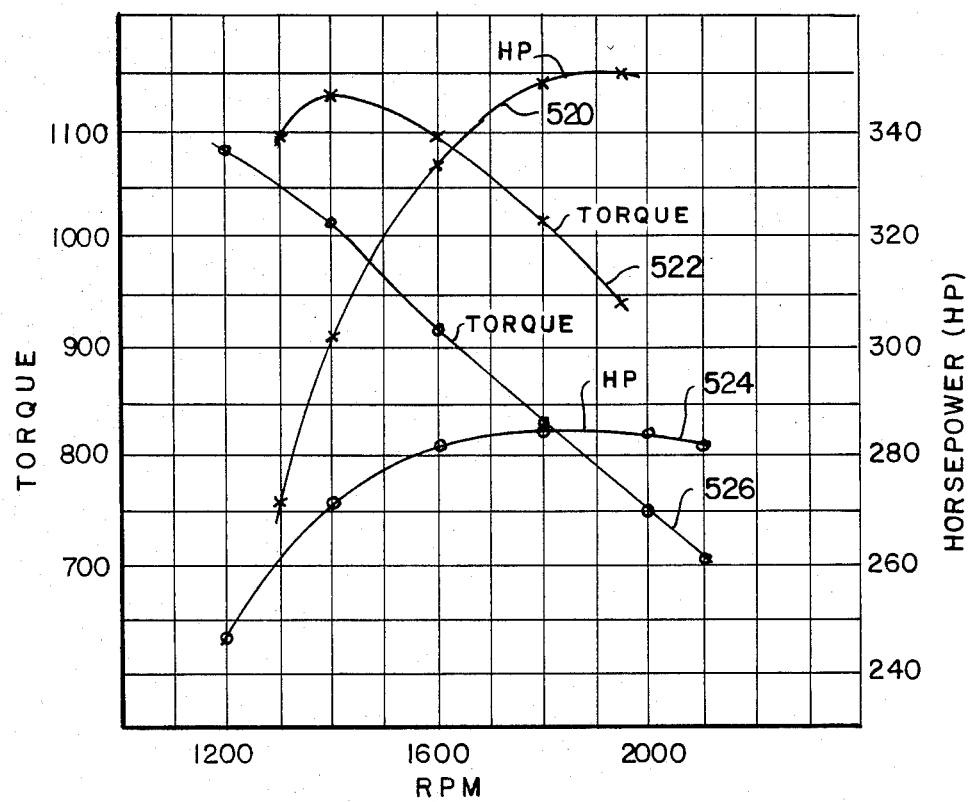
FIG. 24 is a graph with four curves, two curves of maximum horsepower of respective engines and two curves of maximum torque of the respective engines.

Referring to FIG. 24, there are illustrated a horsepower curve 520 and a torque curve 522 for an engine rated at 350 horsepower, and a horsepower curve 524 and a torque curve 526 for an engine rated at 285 horsepower. The two engines are identical except for the maximum fuel flow rates for different engine speeds programmed or stored in the memory of the electronic control. Utilization of engines in different applications, such as in different trucks, requires different horsepower and torque characteristics in order to produce the desired operating characteristics and fuel economy in the different applications. The maximum horsepower and torque of the engines are primarily determined by the maximum fuel quantity for different engine speeds as found in the working file data represented by the curves in FIG. 16. In the prior art this maximum fuel was controlled by the contour of the cam or cams limiting rack movement, but in the present control the maximum fuel is controlled by the stored data for different engine speeds.

Some prior art truck applications require more complex and expensive transmissions such as ten-speed, twelve-speed or even eighteen-speed transmissions rather than the simpler five-speed transmissions due to a narrower range of engine RPM over which the higher torque and horsepower characteristics can be obtained within governmental emission standards and with desired fuel economy. At engine RPM below this range, the air supply rate from the turbo charger is insufficient to enable operation at higher fuel flow rates without violating emission standards, and at engine RPM above this range the engine resistance to higher air flow rates results in substantially increased fuel economy losses. The need to comply with government regulations and the desire to obtain greater fuel economy have resulted in restriction of engine operation to a narrower range of speeds necessitating employment of the more complex and expensive transmissions which also require considerably more operator effort or gear shifting during increase or decrease of road speed.

The present employment of maximum fuel flow data in working memory which can be easily changed for different operating characteristics, such as different gears, enables the employment of a simpler, less expensive transmission, such as a five-speed transmission, in applications where more complex transmissions were previously required. Maximum fuel flow data producing permissible extended ranges of engine operation can be used in the lower gears (first through fourth) during increase or decrease of road speed, and different maximum fuel flow data with a narrower permissible range of engine speed can be used for the highest gear (fifth) to permit high road speed operation at maximum rated horsepower and/or at maximum fuel economy.

Figure 25:
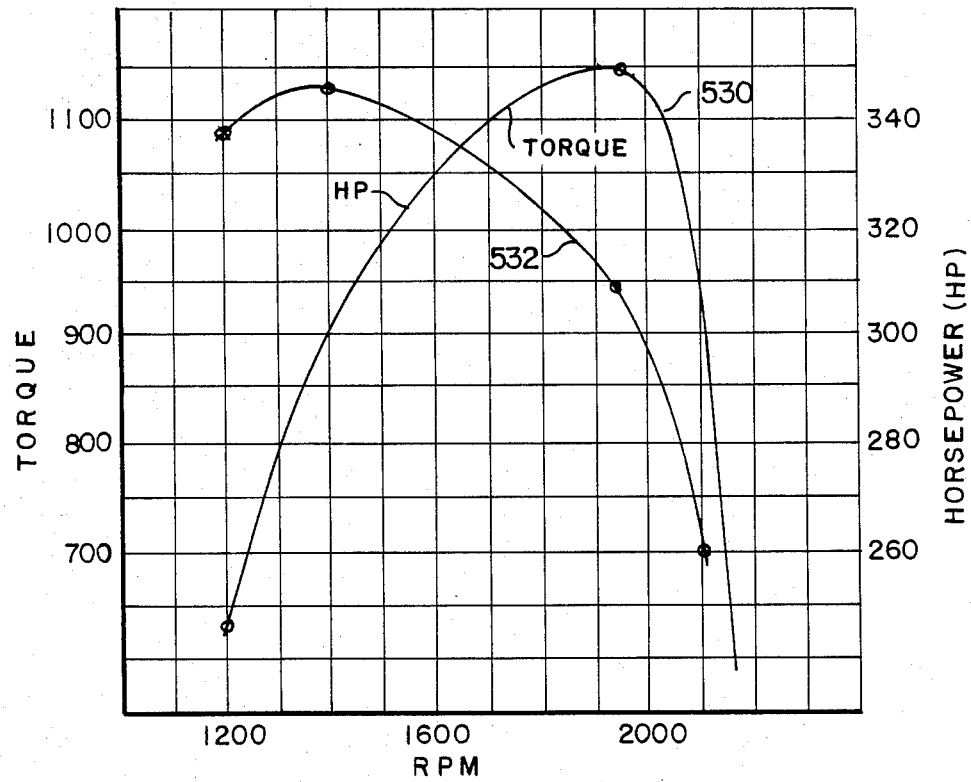
FIG. 25 is a graph with two modified curves, one of a modified maximum horsepower range and one of a modified maximum torque range of an engine.

Additionally power and torque characteristics which could not be practically produced by prior art cam controls can be produced easily by appropriate stored data files. One such set of power and torque characteristics is shown in FIG. 25 made by combining acceptable point ratings from higher and lower horsepower and torque characteristics for the same engine to better exploit the maximum power and fuel economy capabilities of the basic engine when using the five-speed transmission. These particular characteristics are readily obtainable with the electronic control and extremely difficult or practically impossible with mechanical cam controls.

The next step 222 in FIG. 6 reads the temperature set by the exhaust temperature sensor 48 and if the temperature is below a temperature of about 300° F. (150° C.) the program proceeds to step 224 where maximum rack advancement data in the working file (curve 220) is readjusted in accordance with curve 226 of FIG. 16. During cold operating conditions more fuel is required to bring about increases in engine speed, and a greater maximum rack position must be obtainable to enable operation without stalling. If the engine is warm, the program proceeds to step 228 where a request for road speed governor is detected or sensed. In the event that the governing of road speed is requested, the program proceeds to step 230 where the maximum rack position data (curve 220) in the working file is changed in accordance with cruve 232 to limit road speed of the vehicle; this change may also be dependent upon obtaining the highest gear.

The program proceeds to step 234 from step 224, 228 or 230 and sensing whether a diagnostic testing procedure is being done by the diagnostic request from terminal 142. If a diagnostic procedure is being followed, the program jumps to program point G and if no diagnostic procedure is being performed, the program proceeds to step 236 where the coincidence of an RPM reading of zero and an accelerator pedal position reading of zero are detected to proceed to point C in the program. In the event that either RPM or accelerator pedal are greater than zero, the program proceeds to step 238 where the engine speed is compared to an RPM of 2500 and if the RPM is greater than 2500, the program diverts to point C. At point C the program operates in the step 240 to zero the rack by applying a number of stepping pulses, i.e. present position +10 to the stepping motor 56 to retract the stepping motor and the rack 54 at the largest or fastest possible rate. This ensures that fuel flow to the engine is cut off in the event that the engine has stopped and there is no demand for fuel, or the engine is in a runaway mode where the RPM is greater than a safe level.

From step 238 when the engine speed is within safe limits, the program proceeds to step 242 where a demand for shifting of gears is determined. If the accelerator pedal position is detected at zero, this is interpreted as a shift request and the program proceeds to step 244 where a determination is made of whether the rack can be set to zero. If the engine speed is above a minimum value (e.g. 800 RPM) and the rack is at a large enough dimension (e.g. 300 steps), then the program proceeds to point C in step 240 where the rack is moved to the zero position.

Zeroing of the rack also brings about recalibration of the control. In one embodiment, the fuel control rack is movable through a range of about 0.7 inches (18 mm) in steps of about 0.001 inches (0.025 mm) for each step of the stepping motor. The position of the rack is indicated by a value stored in RAM, and this value is updated by adding the pulses applied to the stepping motor to advance the rack and subtracting the pulses applied to the stepping motor to retract the rack. Since the stepping motor may occasionally miss a step, the actual position of the rack may become out of correspondence to the position value stored in RAM. Thus by occasionally zeroing the rack, when permitted, with an excess of retract pulses (the rack is limited by stop 69 so that it cannot retract past zero position) and resetting the position value to zero, the position value will be automatically recalibrated. This enables the elimination of expensive position sensing and feedback systems from the present invention.

If there is no shift request detected in step 242 or the engine speed is not above a minimum RPM, the program proceeds to step 246 where there is determined if the engine control is operating in an all-speed mode. The program can operate in either an all-speed mode, or a minimum-maximum mode which are selected by the operator, for example by means of a minmax-all speed toggle switch (not shown). Alternatively the all-speed mode may be selected by a flag or data bit stored in the data concerning the particular engine or may be called by a push button switch sensed to set an all speed flag.

In the all-speed mode, the position of the accelerator pedal is interpreted as a demand for a special engine speed which is calculated in step 246 in accordance with the formula: selected speed=throttle percent times (high idle speed minus low idle speed)+low idle speed. This special engine speed is used in a special speed mode by the program.

In the minimum-maximum mode, the position of the accelerator pedal is interpreted in later steps as a requested rack position setting and the program will operate to bring about or maintain the requested particular rack position setting as limited by other parameters. The minimum-maximum mode is similar to existing mechanical operated fuel control systems where the accelerator pedal is connected by linkage to the rack and the position of the pedal will thus determine the position of the rack.

In step 248, the determination of a special speed mode request, such as an all-speed mode, a cruise control mode, a turbo unload mode, or a power takeoff mode, is made by sensing the operation of the corresponding switch or possibly flag in case of the all-speed mode, (only the cruise control set push button switch 100 is illustrated in FIG. 4). If there is a request for a special speed mode, the program will branch to step 250; this branching occurs during each program cycle in the all-speed mode and during initial requests in the cruise control mode, the turbo unload mode, or the power takeoff mode. In step 250 appropriate flags are set for the cruise control mode, the turbo unload mode and the power takeoff mode, and a corresponding special engine speed is determined and saved in memory for these modes. In the cruise control mode, the special speed is the present engine speed, and in the turbo unload and power takeoff modes, the special speed is found in the corresponding stored data for the particular engine. Additionally the working file maximum rack position is adjusted for turbo unload and power takeoff modes in accordance with the curve 249, FIG. 16; generally less power is needed in these special modes.

In step 252 following the step 250 the program sets up a special speed control rate working file based upon the special speed rate data (curve 312) in the base file. The special speed rate data in the working file is adjusted so that the zero rate (point 313, FIG. 17) corresponds to the special speed which was saved in memory in step 246 or step 250. The program will maintain the engine speed at this special speed. The program proceeds to point D, FIG. 7, from step 252 or from step 248 if there is no special speed control request.

Steps 254, 256, 258, 260 and 262 concern operation of the engine brake mode and system, such as DYNA-TARD from Mack Trucks, Inc. In steps 254, 256, 258, and 260, the engine brake switch 104 must be detected as being closed, the throttle 42 must be in the zero position, the rack 54 must be in the retracted position, and the engine speed must be greater than 1000 RPM in order for the program to proceed to step 262 where the engine brake system is activated by energization of solenoid valve 126. The program proceeds to step 264 from step 262 or from any of the steps 254, 256, 258 or 260 if the conditions of such steps are not met. In step 264 a maximum rack position is calculated from the working file maximum rack data (curve 220 as may have been modified in accordance with curve 226, 232, or 249). This position determines the maximum fuel corresponding to maximum power or torque of the engine for the current engine speed.

Figure 18:
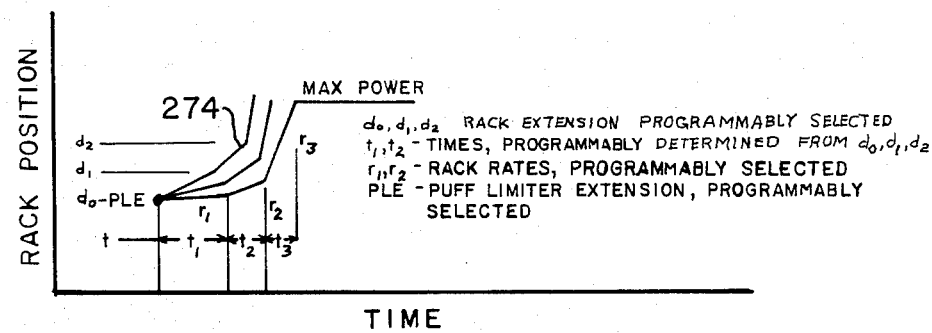
FIG. 18 is a graph of stored data corresponding to permissible rate of change in rack position within a defined range of rack positions to maintain acceptable exhaust emission levels.

From step 264 the program proceeds to step 266 where the present maximum rack position for the cycle RPM is compared to a puff or emissions control limit dimension. When the rack is at a position greater than the puff limit, rapid increases in fuel, or advances in rack position, at a maximum permissible rate can result in the diesel engine producing excessive smoke emissions. This maximum rate is set by stored parameters, for example curve values for curve 320 in FIG. 23 where maximum steps allowed for the stepping motor are set at one hundred twenty-eight steps. At rack positions less than the puff limit, increases in fuel at the maximum rate may be required to bring about engine acceleration for minimum starting and shifting power, to avoid stalling and to enable truck operation. Also excessive smoke emissions are not produced at normal engine speeds when the rack position or fuel flow is increased at the maximum rate. If the maximum rack dimension is above the puff limit, the program proceeds to step 268 where the flags are sensed for special speed control operation. In special speed control operation the maximum rate of increase in fuel is already limited by a low stepping motor rate used during a special speed control mode, and thus there is no need to set limits for rack advancement. If the maximum rack position is below the puff limit in step 266 or a special speed control is detected in step 268 the program proceeds to step 270 where the maximum rack extension rate or normal stepping motor rate is set at the maximum. In the event that the step 268 does not detect a special speed request, the program proceeds to step 272 where a map for the rate of change of the rack position is set up for operation of the stepper motor 56. The possible maps are represented by the family of curves 274 of FIG. 18, these different curves being formed by adjusting a base curve or data in accordance with empirically derived formulas corresponding to engine types:

$$R_1 = r_1 * f_1(S, C, P, X, T_1, T_2, T_3) \text{ for } d_0 \leq d < d_1$$

$$R_2 = r_2 * f_1(S, C, P, X, T_1, T_2, T_3) \text{ for } d_1 \leq d < d_2$$

where
 d = Rack Position
 S = Current RPM
 C = Road Speed
 P = Boost Pressure
 X = RPM
 $T_1$ = Exhaust Temperature
 $T_2$ = Fuel Temperature
 $T_3$ = Timing Advance Setting.

The base data includes maximum permissible steps of rack advancement for present rack position per program cycle, resulting in permissible rates of advancement of the rack within emission standards. This base data is adjusted in accordance with the above formulas where applicable.

Figure 19:
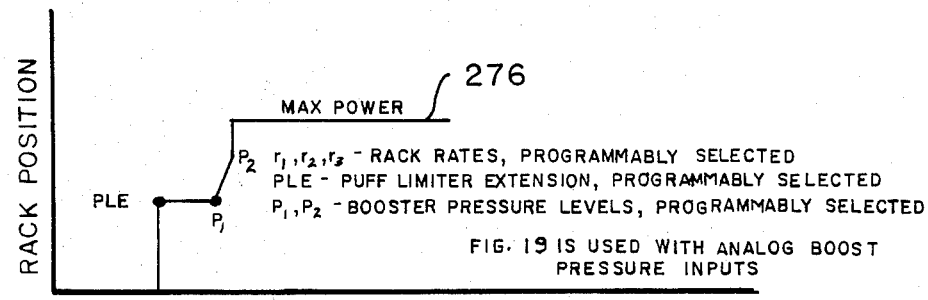
FIG. 19 is a graph illustrating stored data of permissible rate of change in rack position within a defined range of rack positions and relative to boost air pressure which may be used as an alternative to the data of FIG. 16.

Alternatively rack advancement under puff limit controls can be set in accordance with the boost pressure sensor 94, or, for greater accuracy, the difference between the boost pressure sensor 94 and barometric pressure sensor 96, rather than engine speed. Maximum advancement for rack in accordance with puff limits are set in accordance with boost pressure as shown in curve 276 of FIG. 19 which may be a family similar to FIG. 18. In a further alternative the roadspeed from sensor 114 can be used to define a curve limiting rate of rack advancement.

From step 270 or 272, the program proceeds to step 278 where the present exhaust temperature read from the thermocouple 48 is compared with a set point temperature, for example 1150° F. (620° C.). Under heavily loaded conditions at high altitudes, the engine becomes excessively hot due to high fuel/air ratios so altitude compensation for avoiding overheating of the exhaust valves and turbocharger is necessary. If the temperature is greater than the set point, the maximum permissible position for the rack is readjusted in step 280 in accordance with the temperature to permit the engine to run at a lower fuel flow to cool the engine. In the next step 282 the value of the maximum rack position as adjusted for temperature is compared to a lower limit, which conveniently is the puff limit level, and if the maximum rack position is less than the lower limit level, the maximum value is set back up to the lower limit level in step 284. Thus the maximum rack position at excessive exhaust temperatures is linearly reduced, according to the amount by which the exhaust temperature exceeds the set point temperature, except that the maximum rack position cannot be reduced below the lower limit level, which in this example is the puff limit level.

Figure 20:
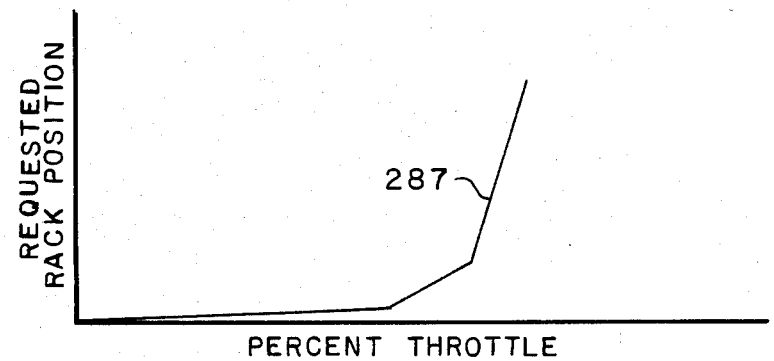
FIG. 20 is a graph illustrating stored data of requested rack position corresponding to detected accelerator position.

From the temperature compensation procedure, the program proceeds to the step 286 where a value of requested rack position is determined in accordance with the reading from the potentiometer 44 of the accelerator pedal. The requested rack position is a nonlinear function selected in accordance with the curve 287 as shown in FIG. 20. This curve is generally parabolic so as to permit greater operator control at low engine RPM to avoid hunting and oscillation by slight changes in accelerator pedal position.

Figure 8:
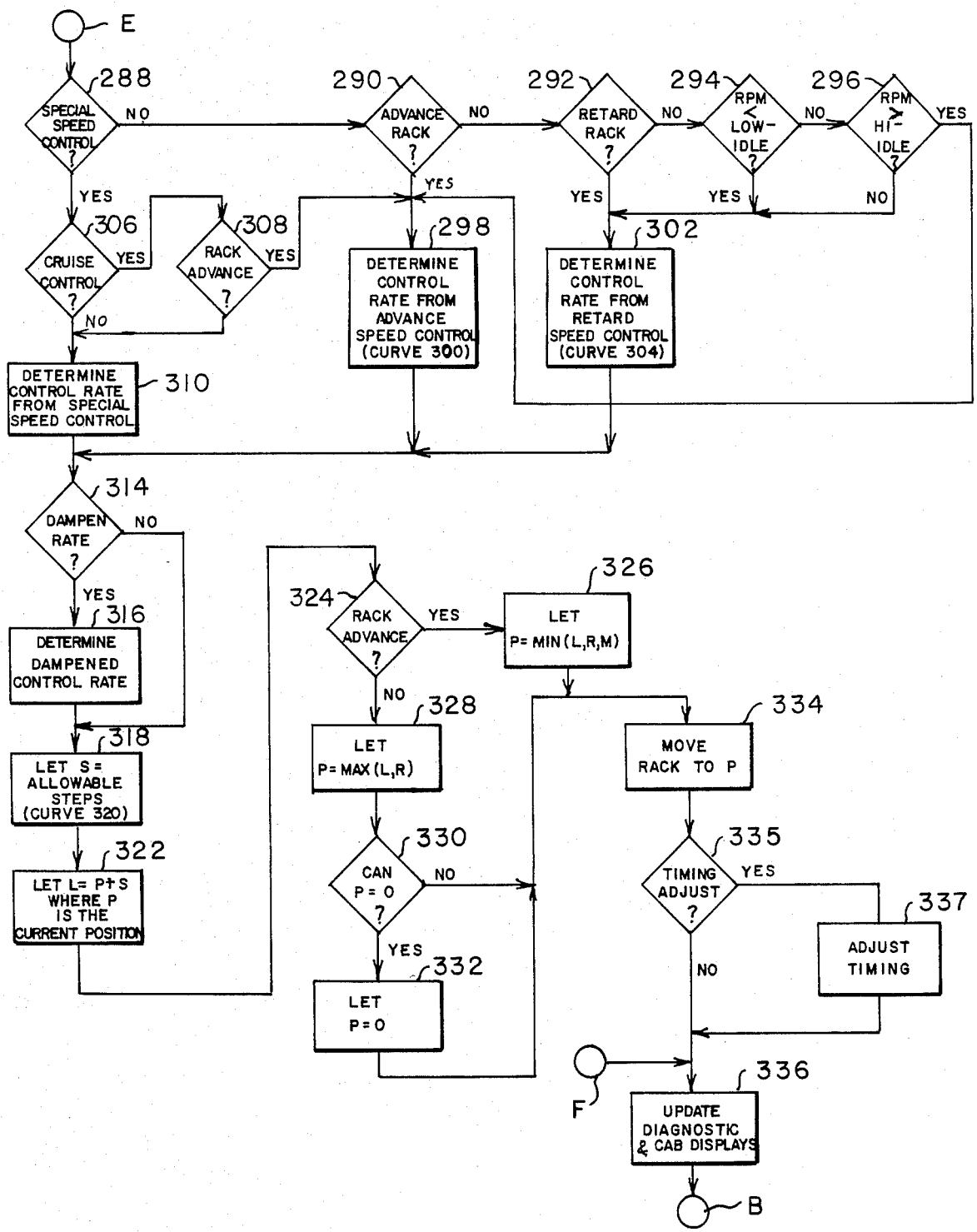
FIG. 8 is a logic flow diagram of a third portion of the computer program for controlling the electronic fuel control.

From step 286 the program proceeds to point E of FIG. 8. At point E in step 288 the special speed control flags are detected and if there are no special speed control requests, the program proceeds to step 290. In step 290 the requested rack position is compared with the present rack position. And if the requested rack position is less than or equal to the present position, the program proceeds to step 292. In step 292 the program advances to step 294 if the requested position is equal to the present position. In step 294 the present engine speed is compared to the low idle speed limit and if the present engine speed is greater, the program proceeds to step 296 where the present engine speed is compared to the hi-idle or normal maximum engine speed limit. If the requested position is greater than the present position or if the requested position is equal to the present position and the present engine speed is greater than the maximum or high idle speed, the program proceeds to step 298 where a advance speed control rate is selected from the data tables in accordance with curve 300 in FIG. 21. If the requested position is less than the present rack position, or if the requested rack position is equal to the present position and the engine speed is more than the low idle speed or less than the high idle speed, the program proceeds to step 302 where a retard speed control rate is determined from data in accordance with curve 304 in FIG. 22. Back in step 288, if a special speed control rate is determined, the program proceeds to step 306 where a test is made to determine if there is a cruise control condition and if so, the program advances to step 308. In the cruise control mode, the operator may depress the accelerator pedal to pass another vehicle. Such a request for passing is detected in step 308 and if so, the program proceeds to step 298 from step 308. If neither a cruise control condition exists in step 306 nor or a request for passing exists in step 308, the program proceeds to step 310 from step 306 or 308. In step 310 a special speed control rate is selected in accordance with the working file special speed rate data as set up in step 252 and as illustrated in curve 312 of FIG. 16.

The datum as represented in curves 300, 304 and 312 are used to calculate a desired rate of change in speed of the engine in accordance with the present engine speed. The value of the rate of change may be positive indicating a desire to increase the present engine speed, may be negative indicating a desire to decrease engine speed, or may be zero indicating a desire to maintain the present engine speed. The zero rate on the special speed curve 312 is set at the special speed determined in step 246 or step 252, and a decrease or increase in present engine speed from the special speed results in a corresponding positive or negative desired rate of change in engine speed. For a requested advance in rack position or increase in fuel from either steps 290 or 308, a positive desired rate of change will be determined in accordance with curve 300 in step 298 except if the present speed is equal to or greater than the high idle speed which results in a zero or negative rate of change, respectively. For a requested retraction of the rack or decrease in fuel from step 292, a negative desired rate of change in engine speed will be determined in accordance with curve 304 in step 302 except that, if the present engine speed is equal to or less than the low idle speed, a zero or positive desired rate of change will result. Where no requested change in rack position is found, the rate of change will be selected from curve 304 in step 302 except, when the present engine speed is greater than the high idle speed, the rate of change is selected to be negative from curve 300 in step 298. The zero difference between requested and present rack positions will subsequently in step 316 result in a zero rate of change when the present engine speed is between the low and high idle speeds.

From steps 298, 302 and 310 the program proceeds to step 314 where a determination of a need to dampen the desired rate of change is made. The absolute value of the difference between the requested rack position and the present rack position is determined. If this absolute value is less than 100, the program proceeds to step 316 where the rate determined in step 298, 302 or 310 is multiplied by the absolute value divided by 100 to produce a dampened desired rate of change of RPM. This multiplication serves to critically dampen the rate of fuel change to avoid overshoot. An exception to this is in the event that the absolute value is zero and the engine speed is less than low idle or higher than high idle; then a false is found in step 314. From step 316 or from step 314 if false or the absolute value of the requested change in rack position is greater than 100, the program proceeds to step 318 where the speed control rate or desired rate of change in engine speed and the actual measured rate of change in speed as determined in step 492 of FIG. 11 are utilized to select the steps to be moved by the rack 54 in accordance with data as illustrated by curve 320 in FIG. 23.

Figure 23:
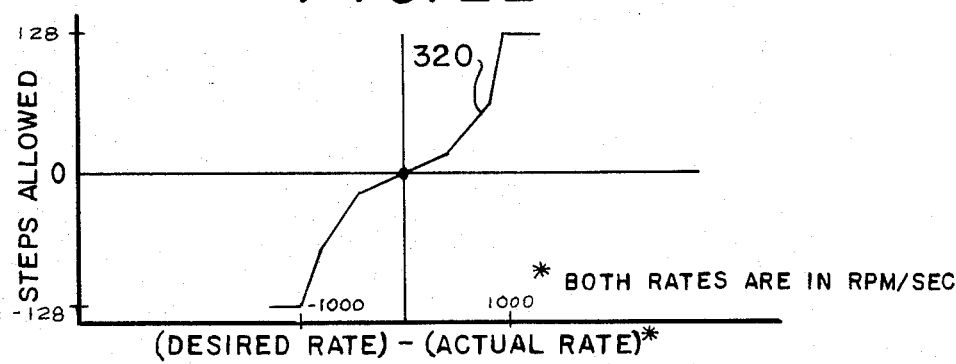
FIG. 23 is a graph illustrating stored computer data of permissible rack steps per program cycle for the difference between desired rate of change of engine speed and the measured actual rate of change of engine speed.

The determination of the number of steps to be made by the stepping motor in accordance with FIG. 23 is based upon the result of subtraction of the measured actual rate of change in engine speed from the desired rate of change in engine speed. This result or remainder may be positive or negative and may be larger or smaller than the desired and actual rates depending upon the magnitude of the desired and actual rates and whether they are positive or negative. Thus the result in step 318 could be a retraction of rack even though the desired rate of change in engine speed is positive in the event that the measured acceleration exceeds the desired acceleration, and vice versa for measured deceleration exceeding desired deceleration. Also the result value could have a magnitude equal to the sum of magnitudes of the desired and actual rates where these rates have opposite signs. This results, in effect, in the prediction and adjustment for future changes in engine speed to substantially reduce any tendency to overshoot a desired engine speed and to substantially stabilize the response of the electronic control to the demands made by accelerator pedal movement. Thus there is substantially eliminated any periodic change in engine speed due to hunting or unstable operation at all ranges of operation. Typical maximum steps are set forth in Table I.

TABLE I

| Difference (RPM/SEC) | Steps |
|---|---|
| 0–60 | 1 |
| 60–119 | 2 |
| 120–239 | 4 |
| 240–349 | 8 |
| 350–499 | 16 |
| 500–749 | 32 |
| 750–999 | 64 |
| 1000+ | 128 |

From the steps to be advanced or retracted determined in step 318, the program determines a new possible position L from the addition of the present position plus the steps determined in 318 within the step 322. The program proceeds to step 324, where the test used in step 290 is applied to determine if there is a requested rack advance or not. If there is a desired rack advance, the program proceeds to step 326 where the proposed rack position is selected to be the minimum of the value calculated in step 322, the value calculated in step 286 or the value selected in step 264 as may have been modified by step 280 or 284. In the event that there is no desired rack advance, the program proceeds to step 328 where the proposed position of the rack is selected to be the maximum value of the values calculated in steps 322 or 286. From step 328 the program proceeds to step 330 where a determination is made if a zero rack position is permissible. A zero rack position will be permissible if the new rack position from step 328 is sufficiently low and the engine speed is above a minimum necessary to maintain engine operation. If the zero position is acceptable the program proceeds with step 332 where the proposed rack position is set at zero; the number of retract pulses to be set greater than the position value to bring about recalibration of the rack position.

From any of the steps 326, 330 or 332, the program moves to step 334 where the least of the maximum number of pulses determined in step 272 or the required number of pulses to advance or retract the rack 54 to the proposed position are applied in the proper polarity to the stepping motor driver 122 and stepper motor 56. In a special speed mode, the maximum number of steps is limited by the program to a number below the minimum puff limit number from step 272. The new position is then stored in memory by adding or subtracting the corresponding number of advance or retract pulses from the present stored position, or by resetting the position value to zero if the rack was returned to the zero position by an excess of retract pulses causing recalibration. From step 334 the program proceeds to step 335 where a determination of the need to adjust timing is made. If true the timing or advance mechanism 52, FIGS. 1 and 3, is operated in step 337. From step 335 or step 337, the program proceeds to step 336 where the displays, if present in the console 140 are updated or changed in accordance with current data. Then the program recycles to point B to begin another cycle.

The stored parameters for the data of the various curves 220, 226, 232, 312, 274, 276, 287, 300, 304 and 320 require a relatively small number of stored values, particularly when compared with stored multidimensional tables utilized in prior art computerized control circuits. Only a point where a change occurs in a curve value need be identified by location and value. Linear interpolation is used to derive values between stored points. For example for a reading of maximum rack position or fuel flow corresponding to maximum power from curve 220 in FIG. 16 for an RPM of about 1000, the program begins at stored data point 450 comparing the associated stored RPM with the present RPM and proceeding to the next point 452 when the present RPM is less. This is repeated for points 452, 454 and 456 until point 458 is reached which is less than 1000 RPM. The ratio derived by the difference between the present RPM (1000) and the RPM at point 458 divided by the difference between RPM's at points 456 and 458 is multiplied by the difference between maximum rack positions at points 456 and 458 with the product being added to the maximum rack position of point 458 to derive the maximum rack position for 1000 RPM. The rack position curve as shown in FIG. 10 is represented by data stored for only eight points. Similar relatively small tables form the other data curves. This also makes possible the storage of a number of curves such as different maximum power curves which can be pointed to or transferred to a working area of RAM during running of the program.

Figure 9:
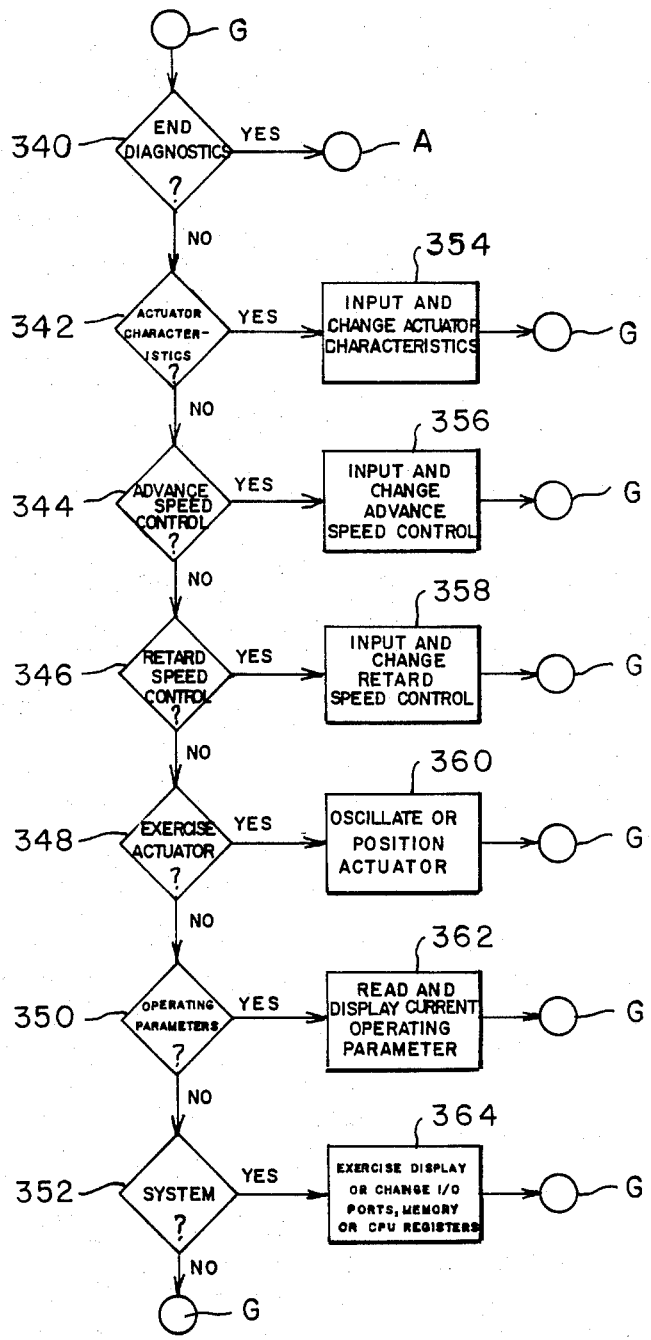
FIG. 9 is a logic flow diagram of a diagnostic portion of the computer program for controlling the electronic fuel control.

The diagnostic procedures are illustrated in FIG. 9. Instructions are entered into the program by the terminal 142 and after each instruction has been entered, the program proceeds to run serially through a series of steps as follows:

Step 340 to test if diagnostic procedure is to be ended,

Step 342 to determine if the stepper 56 operating characteristics are to be changed, Step 344 to determine if the advance speed control is to be changed, Step 346 to determine if the deceleration speed control should be changed, Step 348 to determine if the actuator 132 is to be oscillated or positioned.

Step 350 to determine if operating parameters are to be displayed and step 352 to determine if any of the system parameters or data within the RAM are to be changed and displayed.

In the event that any of the steps 342, 344, 346, 348, 350 or 352 are called by the entered instruction, the diagnostic program proceeds with step 354, 356, 358, 360, 362 or 364 to perform the corresponding procedure called for. At the end of the diagnostic period as detected by the entered instruction to end the diagnostic period, the program proceeds to point A or a reset of the program.

Figure 14:
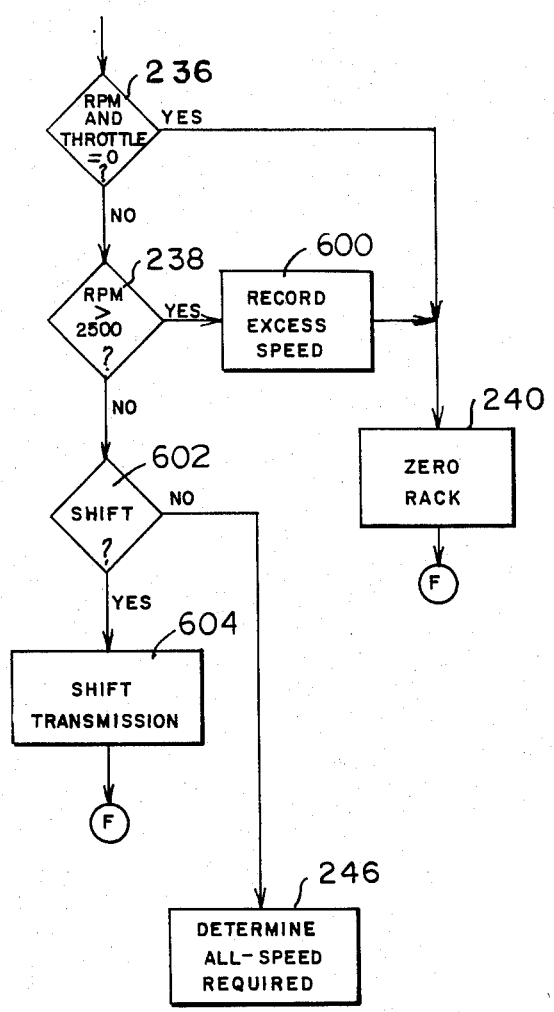
FIG. 14 is a logic flow diagram of a modified portion of the computer program in FIG. 6.
Figure 15:
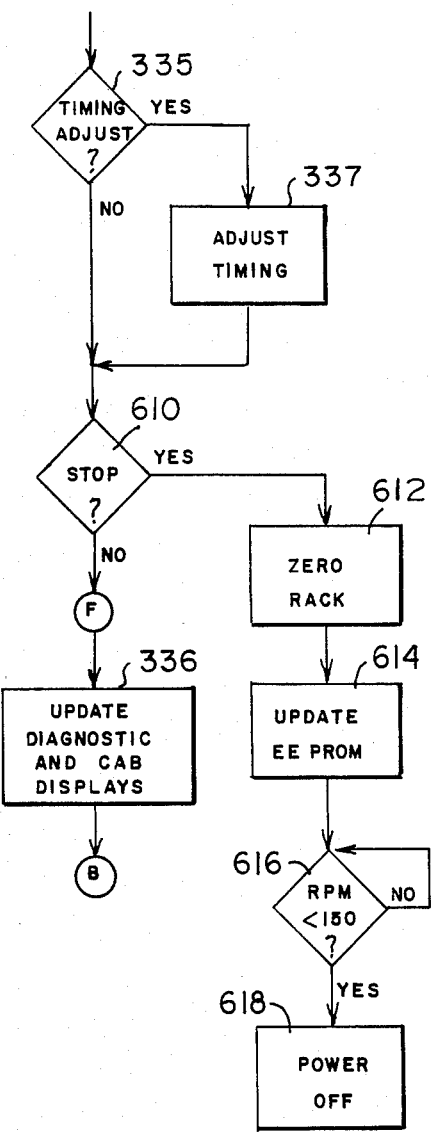
FIG. 15 is a logic flow diagram of a modified portion of the computer program in FIG. 8.

In modifications to the program as illustrated in FIGS. 14 and 15 there is included a step 600 between the steps 238 and 240 wherein an excessive engine speed is recorded in the EEPROM 163. Operation of the engine at an excessive speed, such as can occur on a steep downgrade with a truck in an improper gear, can cause engine damage. Such excessive speed operation generally voids warranties of manufacturer regarding the engine, but excessive speed operation is difficult to prove. By making a record of such excessive speed operation, it can be readily determined if the engine was operated at an excessive speed.

Figure 6:
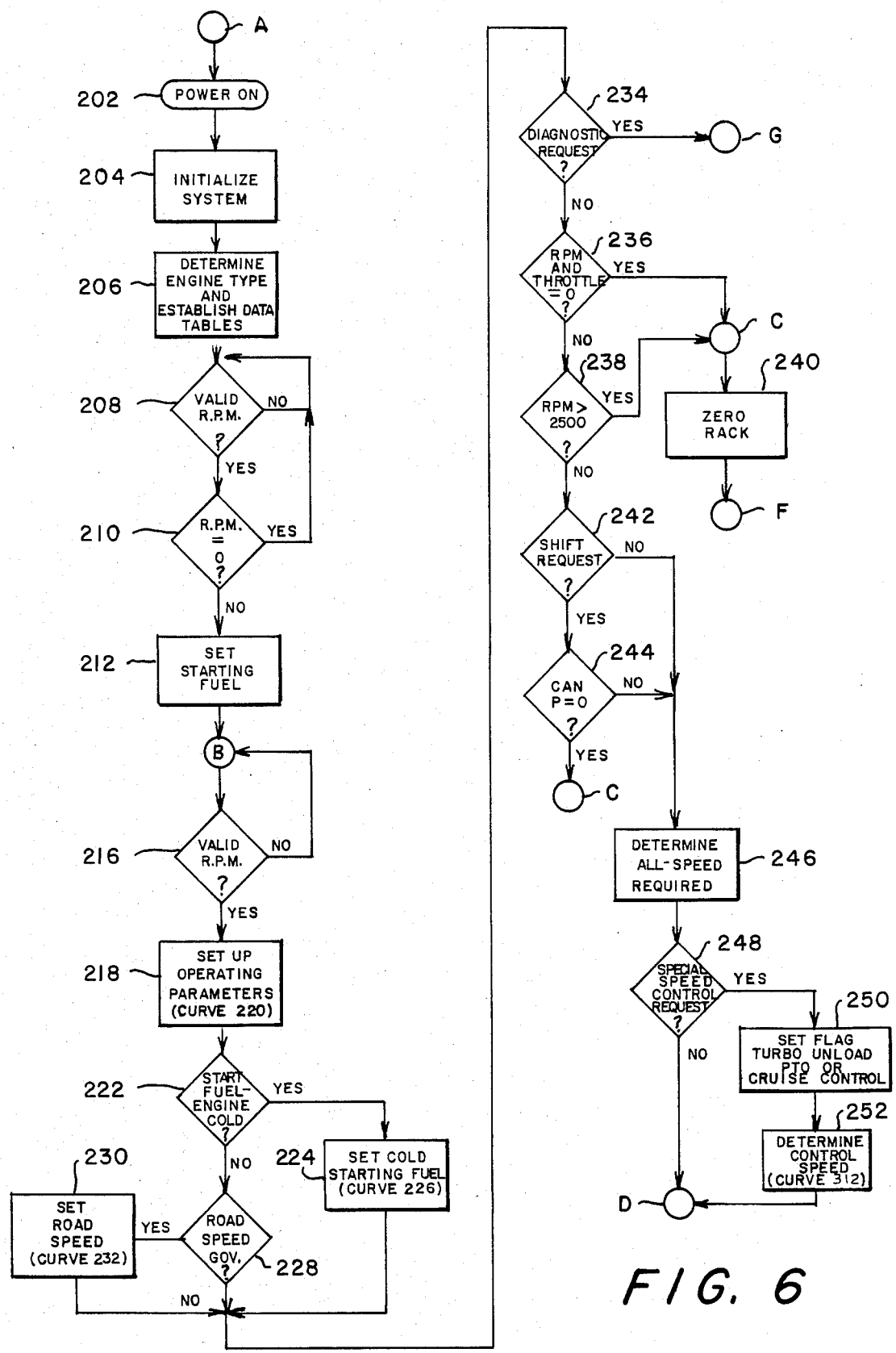
FIG. 6 is a logic flow diagram for a first portion of a computer program for controlling the electronic fuel control in accordance with the invention.
Figure 7:
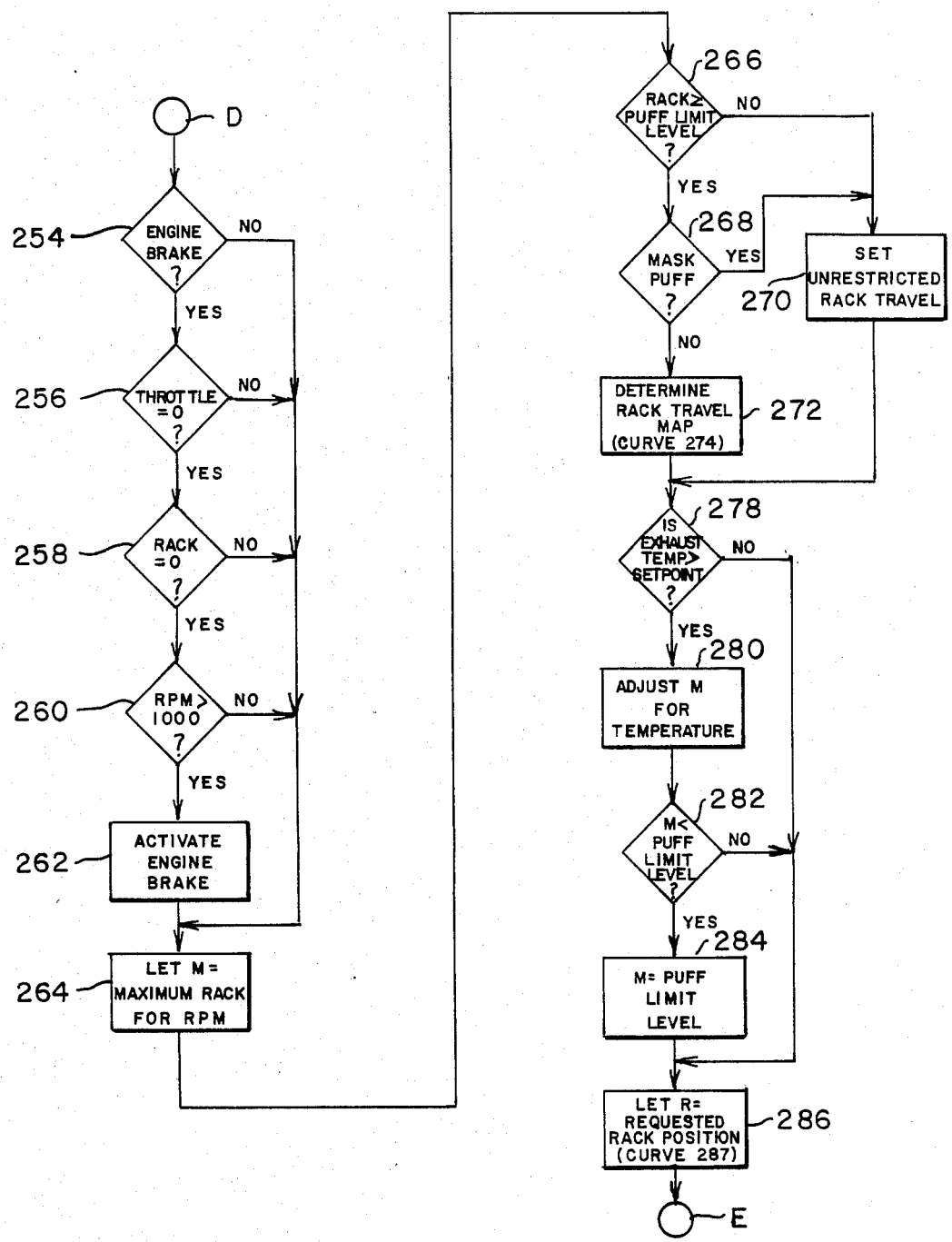
FIG. 7 is a logic flow of a second portion of the program for controlling the electronic fuel control.

Steps 602 and 604 in FIG. 14 replace steps 242 and 244 of FIG. 6 when a transmission employing facilities for automatic shifting is employed in the vehicle, such as the transmission 144, FIG. 4. This transmission is conventional and can include its own electronic operating control to bring about the shifting operations. In step 602, the need for a transmission shift is determined, and if true, the program proceeds to step 604 where the engine control instructs the transmission control for the shift. Alternatively the program in step 604 may operate the transmission in a conventional manner without the aid of an electronic transmission control. The step 602 includes the necessary procedures for changing engine speed which can be in response to requests from the transmission control.

In one embodiment of the electronic control, the engine is stopped by removing power from the control which results in loss of holding power for the stepping motor 56, FIG. 3 to permit the spring 70 to return the fuel control rack 54 to the zero position to terminate fuel flow causing the engine to stop. As an alternative, step 610 in FIG. 15 senses the operation of the stop switch 108, FIG. 4, or the turnoff of power by key switch 149 to branch to step 612 where the rack is returned to the zero position. From step 612, the program proceeds to step 614 where the engine run time is updated in EEPROM 163; the step 406 in FIG. 10 is modified to count an extended time period while the engine RPM is greater than zero. After updating the engine run time in EEPROM 163, the program advances to step 616 where the engine speed is monitored until it drops below a low value, for example 150 RPM whereupon the program in step 618 turns the electrical power off by means of the power conditioning circuit 150.

In the above embodiments, a control for a particular type of diesel engine has been described in detail. However, the described control could be readily applied to other types of engines or prime movers including internal combustion engines and turbines. Instead of controlling a rack in a fuel pump, the control could operate a throttle valve in a carburetor, timers for fuel injection valves, fuel flow value or other engine speed control devices.

The attached microfiche appendix is a computer assembly language and HEX machine language listing for a prototype electronic control utilizing an Intel 8031 processor in accordance with the invention. The operating program is formed in two listings for writing in an EPROM (see ROM 158 FIG. 5). A third listing is of data tables (polygons) for engine characteristics for being written in another EPROM (see EPROM 86 FIG. 5). A portion of one of the two operating program listings is written in the EPROM containing the data tables.

Since many modifications, variations or changes in detail may be made to the above described embodiment, it is intended that all matter in the foregoing description and shown in the accompanying drawings be interpreted as illustrative and not in a limiting sense.

What is claimed is:

1. An electronic control for controlling an engine, comprising engine speed detecting means for generating an electrical engine speed signal corresponding to the speed of the engine, actual rate-of-change determining means for deriving actual rate-of-change values from the engine speed signal corresponding to both increases and deceases in engine speed, desired rate-of-change determining means responsive to a demand factor for deriving desired rate-of-change values corresponding to both increases and decreases in the demand factor, to-be-effected rate-of-change determining means for deriving to-be-effected rate-of-change values corresponding to subtraction of the actual rate-of-change values from the respective desired rate-of-change values, means responsive to the to-be-effected rate-of-change values for correspondingly increasing and decreasing an engine control value, and means responsive to the engine control value for controlling the engine.

2. An electronic control as claimed in claim 1 wherein the engine controlling means controls the fuel flow to the engine.

3. An electronic control as claimed in claim 2 including an operator controlled accelerator member, and means for detecting the position of the accelerator member; and wherein the desired rate of change determining means includes means responsive to values from the accelerator member position detecting means for deriving the desired rate of change values at least partly based upon the values from the accelerator member position detecting means.

4. An electronic control for controlling an engine, comprising engine speed detecting means for generating an electrical engine speed signal corresponding to the speed of the engine, an operator controlled accelerator member, means for detecting the position of the accelerator member, desired rate of change determining means including means for deriving a desired fuel flow value in accordance with a value from the accelerator member position detecting means, means for deriving a desired rate of change value at least partly based upon the difference between the desired fuel flow value and an actual fuel flow value, to-be-effected rate-of-change determining means for deriving a to-be-effected rate-of-change value from a difference between the desired rate-of-change value and an actual rate-of-change value, and means responsive to the to-be-effected rate-of-change value for controlling the fuel flow to the engine.

5. An electronic control as claimed in claim 2 including means for limiting fuel flow below a maximum value corresponding to a maximum power characteristic for the engine.

6. An electronic control as claimed in claim 1 wherein the engine controlling means controls the speed of the engine.

7. An electronic control as claimed in claim 6 including means for presenting a value corresponding to a selected speed; and wherein the desired rate of change determining means includes means for detecting a variation of speed as derived from the electrical engine speed signal from the selected speed value for deriving a desired rate of change values at least partly based upon a difference between said engine speed value and said selected speed value.

8. An electronic control as claimed in claim 7 wherein the means for presenting a speed value includes an operator controlled accelerator member, means for detecting the position of the accelerator member, and means responsive to the accelerator member position detecting means for deriving a selected speed based upon the accelerator member position.

9. An electronic control as claimed in claim 1 including an accelerator pedal, and means for detecting the position of the accelerator pedal; and wherein the engine controlling means, selective means for selecting operation of one of the fuel control means and speed control means, and means responsive to the accelerator position detecting means for deriving the desired rate of change values based at least partly upon the detected accelerator position.

10. An electronic control for controlling an engine, comprising engine speed detecting means for generating an electrical engine speed signal corresponding to the speed of the engine;

actual rate-of-change determining means for deriving an actual rate-of-change value from the engine speed signal;

an accelerator pedal;

means for detecting the position of the accelerator pedal;

desired rate-of-change determining means responsive to the accelerator position detecting means for deriving a desired rate of change value based at least partly upon the detected accelerator position;

to-be-effected rate-of-change determining means for deriving a to-be-effected rate-of-change value from a difference between the desired rate-of-change value and the actual rate-of-change value;

means responsive to the to-be-effected rate-of-change value for controlling the engine;

said engine controlling means including fuel control means, speed control means, selective means for selecting operation of one of the fuel control means and speed control means;

said selective means including operator selecting means for setting a speed request in accordance with a desired cruise control speed; and said speed control means operating the engine speed in accordance with the set cruise control speed.

11. An electronic control for controlling an engine, comprising engine speed detecting means for generating an electrical engine speed signal corresponding to the speed of the engine, actual rate-of-change determining means for deriving an actual rate-of-change value from the engine speed signal, desired rate-of-change determining means for deriving a desired rate-of-change value from a demand factor, means for critically dampening the desired rate of change value based upon an engine parameter being near a demand value, to-be-effected rate-of-change determining means for deriving a to-be-effected rate-of-change value from a difference between the desired rate-of-change value and the actual rate-of-change value, and means responsive to the to-be-effected rate-of-change value for controlling the engine.

12. An electronic control for controlling an engine, comprising engine speed detecting means for generating an electrical engine speed signal corresponding to the speed of the engine, actual rate-of-change determining means for deriving an actual rate-of-change value from a demand factor, means for dampening a desired rate of change value in accordance with a difference between a demand fuel flow and an actual fuel flow, to-be-effected rate-of-change determining means for deriving a to-be-effected rate-of-change value from a difference between the desired rate-of-change value and the actual rate-of-change value, and means responsive to the to-be-effected rate-of-change value for controlling the fuel flow to the engine.

13. An electronic control for managing an engine, comprising engine speed detecting means for generating an electrical engine speed signal corresponding to the speed of the engine;

demand means for presenting a demand value corresponding to a desired control of the engine;

computer means for receiving said engine speed signal and said demand value;

said computer means including actual rate-of-change determinining means for deriving actual rate-of-change values corresponding to both increases and decreases in the engine speed signal, desired rate-of-change determining means for deriving desired rate of change values corresponding to both increases and decreases in the demand value, to-be-effected rate of change determining means for deriving to-be-effected rate of change values corresponding to subtraction of the actual rate of change values from the respective desired rate-of-change values, and means for increasing and decreasing an engine control value in correspondence with the to-be-effected rate of change values, and means responsive to the engine control value for controlling the engine.

14. An electronic control for managing an engine, comprising engine speed detecting means for generating an electrical engine speed signal corresponding to the speed of the engine;

an accelerator member;

means for detecting the position of the accelerator member to present a value corresponding to a desired control of the engine;

computer means for receiving said engine speed signal and said engine control value;

said computer means including an actual rate-of-change determining means for deriving an actual rate of change value from the engine speed signal, means responding to the accelerator member position detecting means for determining a desired fuel flow value, means containing an existing fuel flow value, desired rate of change determining means including means responsive to a difference between the desired fuel flow value and the existing fuel flow value for deriving a desired rate of change value, to be effected rate of change determining means for deriving a to-be-effected rate of change value from a difference between the desired rate of change value and the actual rate of change value; and means responsive to the to-be-effected rate of change value for controlling the engine.

15. An electronic control as claimed in claim 14 wherein the computer means includes memory means containing stored data representing fuel flow values corresponding to detected accelerator member positions, and wherein the desired fuel flow value determining means includes means for determining the desired fuel flow value from the stored data.

16. An electronic control as claimed in claim 13 including an accelerator member, and means for detecting the position of the accelerator member; and wherein the computer means includes means responsive to the accelerator member position detecting means for deriving a desired engine speed, means for deriving an existing engine speed value from the engine speed signal, and wherein said desired rate of change determining means is responsive to the difference between the desired engine speed and the existing engine speed for deriving the desired rate of change values.

17. An electronic control for managing an engine, comprising
    engine speed detecting means for generating an electrical engine speed signal corresponding to the speed of the engine;
    an accelerator pedal;
    means for detecting the position of the accelerator pedal to present a value corresponding to a desired control of the engine;
    computer means for receiving said engine speed signal and said engine control value;
    said computer means including actual rate of change determining means for deriving an actual rate of change value from the engine speed signal, desired fuel flow determining means responsive to the accelerator pedal positioning means for deriving a desired fuel flow value, desired speed determining means responsive to the accelerator position detecting means for deriving a desired speed value, desired rate of change determining means includng selective means for utilizing a selected one of the desired fuel flow value and the desired speed value for deriving a desired rate of change value, to be effected rate of change determining means for deriving a to-be-effected rate of change value from a difference between the desired rate of change value and the actual rate of change value; and
    means responsive to the to-be-effected rate of change value for controlling the engine.

18. An electronic control for managing an engine, comprising
    engine speed detecting means for generating an electrical engine speed signal corresponding to the speed of the engine;
    demand means for presenting a value corresponding to a desired control of the engine;
    computer means for receiving said engine speed signal and said engine control value;
    said computer means including actual rate of change determining means for deriving an actual rate of change value from the engine speed signal, desired rate of change determining means for deriving a desired rate of change value from the demand value, means for dampening the desired rate of change value in response to an operating condition of the engine; and to be effected rate of change determining means for deriving a to-be-effected rate-of-change value from a difference between the desired rate of change value and the actual rate of change value; and
    means responsive to the to-be-effected rate of change value for controlling the engine.

19. An electronic control as claimed in claim 14 wherein the computer means includes means for dampening the desired rate of change value by a selected fraction of the difference between the desired fuel flow value and the existing fuel flow value when such difference is within a selected range.

20. An electronic control as claimed in claim 13 wherein the computer means includes memory means containing engine pollution control operating parameters, and means responsive to the parameters for controlling the speed of operation of the engine controlling means to limit the rate at which the engine is controlled to prevent pollution emissions.

21. An electronic control as claimed in claim 14 wherein the computer includes stored data corresponding to pollution control rates at a selected fuel flow value, and means responsive to the existence of the fuel flow value for limiting the rate of operation of the engine controlling means to avoid pollution emissions.

22. An electronic control for managing fuel flow to a diesel engine which includes a fuel pump having a movable pump control member for controlling the quantity of fuel delivered by the pump to the engine, comprising
    an accelerator member for being moved by an operator,
    electrical means for sensing the position of the accelerator member,
    electrically operated means for moving the control member of the fuel pump,
    engine speed detecting means for generating an electrical engine speed signal corresponding to the speed of the engine, and
    computer means responsive to the accelerator member position sensing means and the electrical engine speed signal for operating the fuel pump control member moving means, said computer means including actual rate of change determining means for deriving actual rate of change values corresponding to both increases and decreases in the engine speed signal, desired rate of change determining means for deriving desired rate of change values from stored parameters in accordance with the engine speed signal and both increases and decreases in the detected position of the accelerator pedal, to be effected rate of change determining means for deriving to-be-effected rate of change values corresponding to subtraction of the actual rate of change values from the desired rate of change values, and means at least partially responsive to the to-be-effected member moving means to produce corresponding movement of the fuel pump control member.

23. An electronic control for managing fuel flow to a diesel engine which includes a fuel pump having a movable pump control member for controlling the quantity of fuel delivered by the pump to the engine, comprising
    an accelerator member for being moved by an operator,
    electrical means for sensing the position of the accelerator member,
    electrically operated means for moving the control member of the fuel pump,
    engine speed detecting means for generating an electrical engine speed signal corresponding to the speed of the engine, and
    computer means responsive to the accelerator member position sensing means and the electrical engine speed signal for operating the fuel pump control member moving means, said computer means including actual rate of change determining means for deriving an actual rate of change value from the engine speed signal, desired rate of change determining means for deriving a desired rate of change value from stored parameters in accordance with the engine speed signal and the detected position of the accelerator pedal, to be effected rate of change determining means for deriving a to be effected rate of change value from a difference between the desired rate of change value and the actual rate of change value, means at least partially responsive to the to be effected rate of change value for operating the control member moving means to produce corresponding movement of the fuel-pump control member, stored data values corresponding to maximum control member position at corresponding engine speed values, and means for determining a maximum control member position value corresponding to the engine speed to limit the desired control member position to a value less than the maximum control member position.

24. An electronic control for managing fuel flow to a diesel engine which includes a fuel pump having a movable pump control member for controlling the quantity of fuel delivered by the pump to the engine, comprising
an accelerator member for being moved by an operator,
electrical means for sensing the position of the accelerator member,
electrically operated means for moving the control member of the fuel pump,
engine speed detecting means for generating an electrical engine speed signal corresponding to the speed of the engine,
computer means responsive to the accelerator member position sensing means and the electrical engine speed signal for operating the fuel pump control member moving means, said computer means including actual rate of change determining means for deriving an actual rate of change value from the engine speed signal, desired rate of change determining means for deriving a desired rate of change value from stored parameters in accordance with the engine speed signal and the detected position of the accelerator pedal, to be effected rate of change determining means for deriving a to be effected rate of change value from a difference between the desired rate of change value and the actual rate of change value, and means at least partially responsive to the to be effected rate of change value for operating the control member moving means to produce corresponding movement of the fuel pump control member, and
said desired rate of change determining means including stored maximum permissible advance rate of change parameters, stored maximum permissible retard rate of change parameters, means for determining an actual control member position value, means responsive to the accelerator member position sensing means for determining a demand control member position value, and means responsive to the demand control member position value being greater than or less than the actual control member position value for selecting a desired rate of change value from the stored maximum permissible advance rate of change parameters or stored maximum permissible retard rate of change parameters respectively.

25. An electronic control as claimed in claim 24 wherein said operating means for the control member moving means includes means for determining a permissible control member position value from the to be effected rate of change value, and means for operating the control member moving means to advance the control member to a position corresponding to a value not exceeding the minimum of the demand control member position value and the permissible control member position value if the demand control member position value is greater than the actual fuel control member position value.

26. An electronic control as claimed in claim 25 wherein said operating means for the control member moving means includes means for operating the control member moving means to retract the control member to a position corresponding to a value not less than the maximum of the demand control member position value and the permissible control member position value if the demand control member position value is equal to or less than the actual fuel control member position value.

27. An electronic control as claimed in claim 25 wherein the computer means includes stored data values corresponding to maximum control member position at corresponding engine speed values, and means for determining a maximum control member position corresponding to the engine speed, and wherein the means for operating the control member moving means to advance the control member further includes means for limiting the advance to a position corresponding to a value not exceeding the maximum control member position value.

28. An electronic control as claimed in claim 25 wherein said operating means for the control member moving means includes means for operating the control member moving means to retract the control member to a position corresponding to a value not less than the maximum of the demand control member position values and the permissible control member position value if the demand control member position value is equal to or less than the actual fuel control member position value.

29. An electronic control as claimed in claim 24 wherein the electrically operated control member moving means includes stepping motor means for moving the control member in the forward and reverse directions in response to forward and reverse pulses, and wherein the means for determining an actual control member position value includes random access memory for storing a control member position value corresponding to the number of forward pulses applied to the stepping motor minus the number of reverse pulses applied to the stepping motor.

30. An electronic control as claimed in claim 29 including stop means for engaging a control member to prevent movement of the control member in a reverse direction past the stop means to define a recalibrate position of the control member, and wherein said computer means includes means for determining when a recalibrate position is acceptable, and means for applying a number of reverse pulses to the stepping motor exceeding the control member position value and for resetting the control member position value to a recalibrate value.

31. An electronic control as claimed in claim 30 wherein the recalibrate position defined by the stop means corresponds to about a zero fuel flow condition, and the recalibrate value is equal to zero.

32. An electronic control for managing fuel flow to control an engine, comprising
demand means for generating an electrical signal corresponding to a demand fuel flow;
engine speed detecting means for generating an electrical signal corresponding to engine speed;
computer means for receiving said demand fuel flow signal and said engine speed signal;
said computer means including stored memory means containing a plurality of stored parameters having maximum fuel flow parameters and rate of change in engine speed parameters corresponding to selected engine speeds, means for determining a demand fuel flow value in accordance with the demand fuel flow signal, means for determining an engine speed value from the engine speed signal, means for determining a maximum fuel flow value from said parameters in accordance with the engine speed value, and means for determining a desired rate of change in engine speed from said rate of change in engine speed parameters in accordance with the engine speed value;
electrically operated fuel control means for supplying fuel to the engine; and
said computer means also including means for setting said fuel control means in accordance with said desired rate of change in engine speed limited by the lesser of the desired fuel flow value and the maximum fuel flow value.

33. An electronic control as claimed in claim 32 wherein said desired rate of change determining means includes stored maximum permissible advance rate of change parameters, stored maximum permissible retard rate of change parameters, means for determining an actual fuel flow value, and means responsive to the demand fuel flow value being greater than or less than the actual fuel flow value for selecting a desired rate of change value from the stored maximum permissible advance rate of change parameters or stored maximum permissible retard rate of change parameters respectively.

34. An electronic control as claimed in claim 33 wherein said means for setting said fuel control means includes means for determining a permissible control member position value from the desired rate of change in engine speed, and means for operating the fuel control means to advance the fuel control means to a position corresponding to a value not exceeding the minimum of the demand fuel flow value and the permissible control means position value if the demand fuel flow value exceeds the actual fuel flow value.

35. An electronic control as claimed in claim 34 wherein said fuel control setting means includes means for operating the fuel control means to retract the control means to a position corresponding to a value not less than the maximum of the demand fuel flow value and the permissible fuel flow value if the demand fuel flow value is equal to or less than the actual fuel flow value.

36. An electronic control as claimed in claim 32 wherein the computer means includes means for determining a present fuel flow value, and means for dampening the desired rate of change in engine speed in accordance with the difference between the demand fuel flow value and the present fuel flow value.

37. An electronic control as claimed in claim 36 wherein the dampening means includes means for multiplying the magnitude of the desired rate of change in engine speed by a fraction having a numerator proportional to the difference between the damand fuel flow value and the present fuel flow value.

38. An electronic control for controlling an engine comprising
engine speed detecting means for generating an electric engine speed signal corresponding to the speed of the engine;
computer means including means responsive to the engine speed signal for producing an engine speed value, stored memory means including parameters of positive and negative rates of change for corresponding engine speed values, means for selecting a rate of change value from the parameters corresponding to the engine speed value, and means responsive to a difference between a desired condition and a present condition for reducing the magnitude of the rate of change value by a fraction which has a numerator proportional to the difference within a predetermined range of differences; and
means at least partly responsive to the reduced rate of change value for controlling the engine.

39. An electronic control as claimed in claim 38 wherein
the stored rate of change parameters include retard rates of change parameters and advance rate of change parameters; said retard rate of change parameters having zero rate of change value at a low idle engine speed, negative rate of change values at engine speeds greater than the low idle speed, and positive rate of change values at engine speeds less than the low idle speed; said advance rate of change parameters having a zero rate of change value at a high idle engine speed, positive rate of change values at engine speeds less than the high idle speed, and negative rate of change values at engine speeds greater than the high idle speeds;
the computer means including means for determining a demand for increase or decrease in engine speed;
the rate of change value selecting means being responsive to a demand for increase in engine speed for selecting a rate of change value from the advance rate of change parameters, and being responsive to a demand for decrease in engine speed for selecting a rate of change value from the retard rate of change parameters.

40. An electronic control as claimed in claim 39 wherein the desired condition and the present condition correspond to desired and present fuel flows, respectively.

41. An electronic control as claimed in claim 38 wherein the stored parameters include a zero rate of change value at a desired engine speed, positive rate of change values at engine speeds less than the desired engine speed, and negative rate of change values at engine speeds greater than the desired engine speed.

42. An electronic control for managing a fuel flow to control an engine, comprising
demand means for generating an electrical demand signal corresponding to a desired engine characteristic;
engine speed detecting means for generating an electrical signal corresponding to engine speed;

computer means for receiving said demand signal and said engine speed signal;

said computer means including stored memory means having advance speed control rate parameters corresponding to different engine speeds, and retard speed control rate parameters corresponding to different engine speeds;

said computer means including means for deriving a demand engine characteristic value from said demand signal and for comparing said demand engine characteristic value with an actual engine characteristic value to determine if the demand value represents an advance request or a retard request and to determine a speed control rate from the corresponding advance speed control rate parameters or retard speed control rate parameters in accordance with the engine speed signal;

electrically operated control means for controlling the engine; and said computer means including means responsive to the determined speed control rate for operating the electrically operated control means.

43. An electronic control as claimed in claim 42 wherein the advance speed control rate parameters include a zero rate of change value at a high idle engine speed, positive rate of change values at engine speeds less than the high idle speed, and negative rate of change values at engine speeds greater than the high idle speeds; the retard speed control rate parameters include a zero rate of change value at a low idle engine speed, negative rate of change values at engine speeds greater than the low idle speed, and positive rate of change values at engine speeds less than the low idle speed.

44. An electronic control for controlling an engine comprising a movable control member for controlling an operating condition of the engine;

stop means for engaging the control member to prevent movement of the control member in a reverse direction past the stop means to define a recalibrate position for the control member;

electrical stepping motor means for moving the control member in the forward and reverse directions in response to forward and reverse pulses;

demand means for producing demand signals for desired engine control;

means responsive to the demand means including computer means with program means for applying forward and reverse pulses to the stepping motor;

said computer means including memory means for storing a control member position value corresponding to the number of forward pulses applied to the stepping motor minus the number of reverse pulses applied to the stepping motor; and said program means also including means for determining when a recalibrate position is acceptable, and means for applying a number of reverse pulses to the stepping motor exceeding the control member position value and for resetting the control member position value to a recalibrate value.

45. An electronic control for controlling an engine as claimed in claim 44 wherein the control member controls fuel flow to the engine, the recalibrate position defined by the stop means corresponds to a zero fuel flow condition, and the recalibrate value is equal to zero.

46. An electronic control as claimed in claim 44 wherein the engine includes a fuel pump and the control member controls the quantity of fuel delivered to the engine by the fuel pump.

47. An electronic control as claimed in claim 44 wherein the electrical stepping motor means includes an electrical rotary stepping motor with rotatable drive means, rotatable screw means driven by the rotatable drive means of the motor, threaded means operated by the screw for advancing and retracting the control member, and rotary spring means attached to the rotatable drive means of the stepping motor for biasing the drive means in the reverse direction to return the control member to the recalibrate position upon loss or removal of operating voltage on the stepping motor means.

48. An electronic control for controlling an engine comprising a movable control member for controlling an operating condition of the engine, said control member having a zero control position, an electrical rotary stepping motor including rotatable drive means, a rotatable screw driven by rotatable drive means of the motor, threaded means operated by the screw for advancing and retracting the control member, rotary spring means attached to the rotatable drive means of the stepping motor for biasing the drive means to return the stepping motor and movable control member to the zero control position, demand means for producing demand signals for desired engine operation, and electrical means responsive to the demand means including computer means with program means for applying forward and reverse pulses to the stepping motor to control operation of the engine and to hold the stepping motor in an advanced position against lthe spring bias.

49. An electronic control as claimed in claim 48 wherein the movable control member controls the flow of fuel to the engine.

50. An electronic control as claimed in claim 49 wherein the engine includes a fuel pump, and the control member controls the fuel delivered by the fuel pump.

51. An electronic control as claimed in claim 50 wherein the engine is a diesel engine, and the control member is a rack for controlling valve members in a fuel pump for the diesel engine.

52. An electronic control for managing fuel flow to an engine comprising demand means for generating an electrical demand fuel flow signal corresponding to a demand fuel flow;

engine speed detecting means for generating an electrical engine speed signal corresponding to engine speed;

computer means for receiving the demand fuel flow signal and the engine speed signal and for converting the signals into a corresponding demand fuel flow value and a corresponding engine speed value;

said computer means including stored memory means containing a plurality of sets of stored maximum power parameters wherein each set of stored maximum power parameters corresponds to a maximum fuel flow producing a maximum permissible power output of the engine at a corresponding engine speed;

electrically operated fuel control means for supplying fuel to the engine;

said computer including means responsive to a sensed parameter for selecting one set of the plurality of sets of stored parameters and for computing maximum fuel flow values therefrom at corresponding engine speed values; and said computer means also including means responsive to the demand fuel flow value and the engine speed value for operating the fuel control means at least partially in response to the demand fuel flow value except that if the demand fuel flow value exceeds the corresponding maximum fuel flow value then the fuel flow means is operated in accordance with the maximum fuel flow value.

53. An electronic control as claimed in claim 52 wherein the selecting and computing means includes programmable read only memory means with an engine type identifying parameter stored therein, and means for selecting the set of stored parameters in accordance with the engine identifying parameter stored in the programmable read only memory means.

54. An electronic control as claimed in claim 52 wherein the selecting and computing means selects the set of stored parameters in accordance with a sensed gear position of a transmission.

55. An electronic control as claimed in claim 52 wherein the selecting and computing means includes means for detecting a tampering with the electronic control, and means for selecting a set of stored parameters corresponding to a lower power output if tampering is detected.

56. An electronic control as claimed in 55 wherein the tampering detecting means includes first programmable read only memory means with a first engine identifying parameter stored therein; and the selecting and computing means includes second programmable read only memory means with a second engine identifying parameter stored therein; said tampering detecting means including means for comparing the first engine identifying parameter with the second engine identifying parameter to detect a tampering.

57. An electronic control as claimed in claim 56 wherein one of the first and second programmable read only memory means is an electrically erasable programmable read only memory means, and the computer includes program means for sensing a null parameter in the electronically erasable programmable read only memory means for storing the engine identifying parameter in the electrically erasable programmable read only memory means from the other programmable read only memory means.

58. An electronic control as claimed in claim 52 wherein the computer means includes electrically programmable read only memory means, and wherein said set of stored parameters selecting means includes means responsive to an engine identifying means on a first operation of the control for reading the selected set of plurality of sets of stored parameters and for storing said selected set in the electrically programmable read only memory means.

59. An electronic control as claimed in claim 52 wherein said computer means also includes stored memory means containing rate of change in engine speed parameters corresponding to selected engine speeds, said computer means includes means for determining a desired rate of change in engine speed from said rate of change engine speed parameters in accordance with the engine speed value, means for determining a desired fuel flow value from said desired rate of change in engine speed, and wherein said fuel control operating means is also responsive to the desired fuel flow value for setting said fuel control means in accordance with one of the desired fuel flow value, demand fuel flow value and maximum fuel flow value.

60. An electronic control as claimed in claim 59 wherein the computer means includes means for determining an actual fuel flow value; and said fuel control operating means includes means for operating the control means in accordance with the lesser of the demand fuel flow value, desired fuel flow value and maximum fuel flow value if the demand fuel flow value is greater than the actual fuel flow value, and means for operating the control means in accordance with the greater of the demand fuel flow value and desired fuel flow value if the demand fuel flow value is less than the actual fuel flow value.

61. An electronic control as claimed in claim 52 wherein the engine is a diesel engine which includes a fuel pump having a movable pump control member for controlling the quantity of fuel delivered by the pump to the engine, said electrically operating fuel control means includes means for moving the control member of the fuel pump.

62. An electronic control as claimed in claim 61 wherein the computer means includes memory means containing stored rate of change in engine speed parameters corresponding to engine speeds, means for determining a desired rate of change from said stored rate of change parameters, means for deriving an actual rate of change value from the engine speed signal, to be effected rate of change determining means for deriving a to be effected rate of change value from a difference between the desired rate of change value and the actual rate of change value, means responsive to the to be effected rate of change value for determining a desired fuel flow value, and wherein the fuel control operating means includes means for operating the fuel control means in accordance with one of the demand fuel flow value, desired fuel flow value or maximum fuel flow value.

63. An electronic control for controlling an engine comprising demand means for generating an electrical engine control signal;

engine speed detecting means including a rotating member with angularly spaced indicating means driven by the engine, and sensing means for sensing the passing of the indicating means past a sensing point to produce an electrical engine speed signal having pulses with a frequency corresponding to engine speed;

electrically operated engine control means for controlling operation of the engine; and computer means for receiving the engine control signal and the engine speed signal, timing means, means for counting pulses in the engine speed signal, first means responsive to a previously recorded engine speed value being less than a predetermined value for terminating the counting after a first predetermined number of counts, second means responsive to the previously recorded engine speed value being greater than the predetermined value for terminating the counting after a second predetermined number of counts greater than the first predetermined number, means for computing an engine speed value from the number of pulses counted and the difference between the value of the timing means at the beginning of the counting and a value of the timing means at the termination of the counting, means containing stored engine operating parameters, and means responsive to the engine control signal, the engine speed value, and the stored engine operating parameters for operating the engine control means.

64. An electronic control as claimed in claim 63 wherein the computer means includes means for determining an actual rate of change in engine speed by determining a difference between the computed engine speed value and a previous engine speed value and dividing the difference by the elapsed time corresponding to the time from the beginning of the previous counting period to the beginning of the present counting period, means responsive to the electrical engine control signal for determining a desired rate of change, means responsive to the difference between the desired rate of change and the actual rate of change for determining a desired operating condition of the engine for operating the engine control means.

65. An electronic control as claimed in claim 63 wherein the second means is limited by a previously recorded engine speed value greater than a second predetermined value greater than the first predetermined value, and the computer means includes third means responsive to the previously recorded engine speed value being greater than the second predetermined value for terminating the counting after a third predetermined number of counts greater than the second predetermined number of counts.

66. An electronic control as claimed in claim 63 wherein the computer means for counting of pulses includes interrupt means initiated after expiration of a selected duration of the timing means, said interrupt means including means for resetting the timing means.

67. An electronic control as claimed in claim 66 wherein the interrupt means includes means for extending the elapsed counting time and for continuing the count if a second interrupt occurs prior to completion of the count of the selected number of pulses, and means for computing an engine speed value from a number of pulse edges counted if a third interrupt occurs prior to completion of the counting of the selected number of pulses.

68. An electronic control for controlling an engine comprising
demand means for generating an electrical engine control signal;
engine speed detecting means including a rotating member with angularly spaced indicating means driven by the engine, and sensing means for sensing the passing of the indicating means past a sensing point to produce an electrical engine speed signal having pulses with a frequency corresponding to engine speed;
electrically operated engine control means for controlling operation of the engine;
computer means including means for receiving the engine control signal and the engine speed signal, timing means, interrupt means initiated after expiration of a selected duration of the timing means for counting a selected number of pulses in the engine speed signal and for computing an engine speed value from the time elapsed during counting of the pulses, means containing stored engine operating parameters, and means responsive to the engine control signal, the engine speed value and the stored engine operating parameters for operating the engine control means; and
said interrupt means including means to restart the timing means after an interrupt, means for extending the elapsed counting time and for continuing the count if a second interrupt occurs prior to completion of the count of the selected number of pulses, and means for computing an engine speed value from a number of pulse edges counted if a third interrupt occurs prior to completion of the counting of the selected number of pulses.

69. An electronic control as claimed in claim 68 wherein the interrupt means includes means for determining an actual rate of change in engine speed from a present engine speed value, a previous engine speed value and the elapsed time from the interrupt beginning the previous counting period and the interrupt beginning the present counting period, and wherein said computer means includes means for determining a desired rate of change based upon the engine control signal and the engine speed value, means based upon the difference between the actual rate of change and the desired rate of change for determining a desired operating condition to be effected by the engine control operating means.

70. An electronic control for controlling an internal combustion engine having a plurality of cylinders which are successively fired, comprising
demand means for generating an electrical engine control siganl;
engine speed detecting means including a rotating member with angularly spaced indicating means driven by the engine, and sensing means for sensing the passing of the indicating means past a sensing point to produce an electrical engine speed signal having pulses with a frequency corresponding to engine speed, said rotating member and indicating means being such that the same integer number of indicating means pass the sensing point between each successive pair of cylinder firings;
electrically operated engine control means for controlling operation of the engine;
computer means including means for receiving the engine control signal and the engine speed signal, means for counting a predetermined number of pulses in the engine speed signal, said predetermined number of pulses being selected to correspond to an integer number of intervals between successive cylinder firings, timing means, means for computing an engine speed value from the number of pulses counted and the difference between a value of the timing means at the beginning of the counting and a value of the timing means at the termination of the counting, means containing stored engine operating parameters, and means responsive to the engine control signal, the engine speed value and the stored engine operating parameters for operating the engine control means.

71. An electronic control claimed in claim 70 wherein the counting means of the computer means includes first means responsive to a previously recorded engine speed value being less than a predetermined value for terminating the counting after a first predetermined number of counts, second means responsive to the previously recorded engine speed value being greater than the predetermined value for terminating the counting after a second predetermined number of counts greater than the first predetermined number of counts.

72. An electronic control as claimed in claim 70 wherein the counting means includes interrupt means initiated after expiration of a selected duration of the timing means for counting the predetermining number of pulses, means to restart the timing means after an interrupt, means for extending the elapsed counting time and for continuing the count if a second interrupt occurs prior to completion of the count of the predetermined number of pulses, and means for computing an engine speed value from a number of pulse edges counted if a third interrupt occurs prior to the completion of the counting of the selected number of pulses.

73. An electronic control as claimed in claim 71 wherein the counting means includes interrupt means initiated after expiration of a selected duration of timing means for counting the number of pulses, means for restarting the timing means after an interrupt, means for extending the elapsed counting time and for continuing the count if a second interrupt occurs prior to completion of the count of the number of pulses, and means for computing an engine speed value from a number of pulse edges counted if a third interrupt occurs prior to completion of the counting of the selected number of pulses.

74. An electronic control for an engine comprising
    accelerator means for generating an electrical engine control signal;
    engine speed detecting means for generating an electrical engine speed signal corresponding to engine speed;
    electrically operated engine control means for controlling operation of the engine;
    means for selecting a low idle engine speed value;
    computer means including means for receiving the engine control signal and the engine speed signal, means containing stored engine operating parameters including a high idle engine operating speed value, and means responsive to the engine control signal for operating the engine control means to correspondingly increase and decrease engine speed between the low idle and high idle engine speed values in accordance with the engine control signals and the stored engine operating parameters; and
    said low idle selecting means including a plurality of settings corresponding to different low idle speeds which may be selected.

75. An electronic control as claimed in claim 74 wherein the computer means includes means responsive to the engine speed signal for producing an engine speed value, stored memory means including stored retard rate of change parameters and advance rate of change parameters, said retard rate of change parameters having a zero rate of change value at the selected low idle engine speed value, negative rate of change values at engine speeds greater than the low idle engine speed value, positive rate of change values at engine speeds less than the low idle engine speed value and means for adjusting said values to correspond to the selected value; said advance rate of change parameters having a zero rate of change value at the high idle engine operating speed value, positive rate of change values at engine speeds less than the high idle engine speed value and negative rate of change values at engine speeds greater than the high idle engine speed value; means for determining a demand for increase or decrease in engine speed; and said engine control operating means including means responsive to a demand for increase in engine speed for selecting a rate of change value from the advance rate of change parameters, and being responsive to a demand for decrease in engine speed for selecting a rate of change value from the retard rate of change parameters.

76. An electronic control for controlling an engine in a vehicle having a battery and engine starting means including an electrical starter motor operated by a substantial current from the battery to cause a substantial voltage drop across the battery, the control comprising
    accelerator means for generating an electrical engine control signal;
    engine speed detecting means for generating an electrical engine speed signal corresponding to engine speed;
    electrically operated engine control means for controlling operation of the engine;
    computer means including reset and initializing means responsive to a reset signal, means for receiving the engine control signal and the engine speed signal, means containing stored engine operating parameters, and means responsive to the engine control signal for operating the engine control means in accordance with the stored engine operating parameters; and
    means for sensing a battery voltage below a predetermined voltage to apply a reset signal to the computer means wherein the predetermined voltage is greater than a battery voltage during an initial energization of the starting motor but less than battery voltage after the engine begins to rotate.

77. An electronic control for controlling an engine in a vehicle, comprising
    demand means controllable by a vehicle operator for generating electrical demand signals indicating desired operating conditions of the engine;
    sensing means for sensing operating conditions and producing electrical condition signals therefrom;
    computer means including means for receiving the demand signals and the condition signals; means containing stored engine operating parameters; means responsive to the demand signals, the condition signals and the engine operating parameters for producing electrical engine control signals; electrically erasable programmable read only memory means; means for determining a significant event in operation of the engine; and means responsive to the determination of a significant event in engine operation for recording an indication thereof in the electrically erasable programmable read only memory means; and
    electrically operated engine control means for controlling operation of the engine.

78. An electronic control as claimed in claim 77 wherein the means for determining a significant event includes means for determining a tampering with the engine control.

79. An electronic control as claimed in claim 77 wherein the means for determining a significant event includes means for determining an overspeed condition of the engine.

80. An electronic control as claimed in claim 77 wherein the means for determining a significant event includes means for determining operating time of the engine during engine operation, and the means for recording an indication includes means for updating an operating time in the electrically erasable programmable read only memory means upon power turn off of the control.

* * * * *